(12) United States Patent
Moussa et al.

(10) Patent No.: US 11,371,847 B2
(45) Date of Patent: Jun. 28, 2022

(54) SENSOR PLACEMENT AND METHODS FOR AIDING NAVIGATION DURING GNSS SIGNAL OUTAGE

(71) Applicant: UTI LIMITED PARTNERSHIP, Calgary (CA)

(72) Inventors: Mohamed Moussa, Calgary (CA); Adel Moussa, Calgary (CA); Naser El-Sheimy, Calgary (CA)

(73) Assignee: UTI Limited Partnership, Calgary (CA)

( * ) Notice: Subject to any disclaimer, the term of this patent is extended or adjusted under 35 U.S.C. 154(b) by 125 days.

(21) Appl. No.: 16/721,300

(22) Filed: Dec. 19, 2019

(65) Prior Publication Data
US 2020/0208982 A1   Jul. 2, 2020

Related U.S. Application Data

(60) Provisional application No. 62/785,869, filed on Dec. 28, 2018.

(51) Int. Cl.
| | | |
|---|---|---|
| *G01C 21/16* | (2006.01) | |
| *B60W 40/10* | (2012.01) | |
| *G05D 1/02* | (2020.01) | |

(52) U.S. Cl.
CPC ........... *G01C 21/165* (2013.01); *B60W 40/10* (2013.01); *G05D 1/0255* (2013.01);
(Continued)

(58) Field of Classification Search
None
See application file for complete search history.

(56) References Cited

U.S. PATENT DOCUMENTS

| | | | | |
|---|---|---|---|---|
| 6,243,657 B1 * | 6/2001 | Tuck | ................. | G01N 29/2412 |
| | | | | 702/150 |
| 2004/0068353 A1 * | 4/2004 | Momiyama | ............ | B62D 5/008 |
| | | | | 701/41 |

(Continued)

FOREIGN PATENT DOCUMENTS

| | | | | |
|---|---|---|---|---|
| DE | 102015106401 A1 * | 10/2016 | ........... | G01S 15/931 |
| DE | 102015106404 A1 * | 10/2016 | .......... | G01M 17/027 |
| DE | 102015106408 A1 * | 10/2016 | ............ | B60W 40/06 |

OTHER PUBLICATIONS

Syed, Z., et al. "Improved Vehicle Navigation Using Aiding With Tightly Coupled Integration" 2008, IEEE. 5 Pages.
(Continued)

*Primary Examiner* — Gennam M Mott
(74) *Attorney, Agent, or Firm* — Brion Raffoul

(57) ABSTRACT

Systems and methods for use in aiding an inertial navigation system during a GNSS signal outage. An ultrasonic transceiver is positioned adjacent a wheel of a vehicle and reflections of the emitted signal are used to determine changes of direction and/or to determine a distance traveled by the vehicle. For changes of direction, the transceiver is adjacent to a front wheel such that left or right turns cause the wheel to interrupt a signal path from the transceiver to a reflector. For distance estimates, the transceiver is adjacent a back wheel of the vehicle. The ultrasonic signal is reflected off of solid sections of the wheel or passes through void sections of the wheel. The measurements obtained can be processed in various ways to estimate number of rotations of the wheel and, accordingly, the distance traveled by the vehicle.

10 Claims, 29 Drawing Sheets

(52) U.S. Cl.
CPC ....... *G05D 1/0272* (2013.01); *B60W 2520/06* (2013.01); *B60W 2556/50* (2020.02); *B60W 2556/60* (2020.02)

(56) References Cited

U.S. PATENT DOCUMENTS

| | | | |
|---|---|---|---|
| 2015/0032287 A1* | 1/2015 | Duppong | B60C 23/067 701/1 |
| 2021/0291903 A1* | 9/2021 | Oh | B62D 5/0463 |

OTHER PUBLICATIONS

Wang, Z., et al. "Error Factor and Mathematical Model of Positioning with Odometer Wheel" Aug. 9, 2014., Hindawi Publishing Corporation, Advances in Mechanical Engineering. 7 Pages.

Wangping, Z., et al. "Design of the smart car for emergent disaster detection" School of Information & Control, Nanjing University of Information Science & Technology., Nanjing China. 3 Pages.

Won, D., et al. "Performance Improvement of Inertial Navigation System by Using Magnetometer with Vehicle Dynamic Constraints" Journal of Sensors, vol. 2015, 2015 Hindawi Publishing Corporation 12 Pages.

Abosekeen, A., et al. "Comparative Analysis of Magnetic-Based RISS Using Different MEMS-Based Sensors" 30th International Technical Meeting of the Satellite Division of the Institute of Navigation. Sep. 25-29, 2017. 17 Pages.

Abosekeen, A., et al. "Utilizing the ACC-FMCW Radar for Land Vehicles Navigation" IEEE, 2018. 9 Pages.

Borenstein, J., et al. "Measurement and Correction of Systematic Odometry Errors in Mobile Robots" IEEE Transactions on Robotics and Automation, vol. 12, No. 6, Dec. 1996. 25 Pages.

Borenstein, J., et al. "Obstacle Avoidance with Ultrasonic Sensors" IEEE Journal of Robotics and Automation. vol. 1, No. 2, Apr. 1988 6 Pages.

Chirca, M., et al. "Autonomous Valet Parking System Architecture" IEEE 18th International Conference on Intelligent Transportation Systems, 2015. 6 Pages.

Salmon, D. "An Experimental Exploration of Low-Cost Sensor and Vehicle Model Solutions for Precision Ground Vehicle Navigation" Dec. 12, 2015. Auburn University, Alabama 129 Pages.

Farooq ,U., et al. "Design and Implementation of Fuzzy Logic Based Autonomous Car for Navigation in Unknown Environments" 2013 IEEE. 7 Pages.

Cao, Y., et al. "INS/GPS/LiDAR Integrated Navigation System for Urban and Indoor Environments Using Hybrid Scan Matching Algorithm" Sep. 15, 2015. Sensors 2015, 15. 17 Pages.

Han., S., et al. "Mobile Robot Navigation by Circular Path Planning Algorithm Using Camera and Ultrasonic Sensor" EEE International Symposium on Industrial Electronics, Jul. 5-8, 2009. Seoul, Korea. 6 Pages.

Jian, W., et al. "The Design of Autonomous Smart Car Used in Simulation of Vehicle Platoon" IEEE Pacific-Asia Workshop on Computational Intelligence and Industrial Application, 2008, 6 Pages.

Khan, M.O., et al. "Learning Live Autonomous Navigation: A Model Car with Hardware Arduino Neurons" IEEE International Conference on Systems, Man, and Cybernetics, Oct. 9-12, 2016 Budapest, Hungary. 6 Pages.

Lee, B-H., et al. "GPS/DR Error Estimation for Autonomous Vehicle Localization" Aug. 21, 2015. Sensors 2015, 15. 20 Pages.

Lee, S., et al. "Intelligent Parking Lot Application Using Wireless Sensor Networks" IEEE. 2008. 10 Pages.

Lim, J., et al. "Ultrasonic-Sensor Deployment Strategies and Use of Smartphone Sensors for Mobile Robot Navigation in Indoor Environment" IEEE. 2014. 6 Pages.

Moussa, M., et al. "Multiple Ultrasonic Aiding System for Car Navigation in GNSS Denied Environment" IEEE. 2018. 8 Pages.

Niu, X., et al. "An Accurate Land-Vehicle Mems IMU/GPS Navigation System Using 3D Auxiliary Velocity Updates" Journal of the Institute of Navigation, vol. 54, No. 3, 2007 USA. 12 Pages.

Noureldin, A., et al. "Fundamentals of Inertial Navigation Satellite-based Positioning and their Integration" 2013. Springer-Verlag. Berlin Heidelberg, 324 Pages.

Petovello, M.G. "Real-Time Integration of a Tactical-Grade IMU and GPS for High-Accuracy Positioning and Navigation" Apr. 2003, Geomatics Engineering. Calgary, Alberta, 269 Pages.

Shin, E. H. "Accuracy Improvement of Low Cost INS/GPS for Land Applications" Dec. 2001, Geomatics Engineering. Calgary, Alberta, 137 Pages.

\* cited by examiner

SENSOR PLACEMENT AND METHODS FOR AIDING NAVIGATION DURING GNSS SIGNAL OUTAGE

RELATED APPLICATIONS

This is a non-provisional application which claims the benefit of U.S. Provisional Application No. 62/785,869 filed on Dec. 28, 2019.

TECHNICAL FIELD

The present invention relates to navigation. More specifically, the present invention relates to systems and methods for aiding land-based navigation during a GNSS signal outage.

BACKGROUND

Recently, there have been enormous efforts for autonomous car developments especially in the field of the navigation enhancement using low cost navigation systems. Global Navigation Satellite System/Inertial Navigation System (GNSS/INS) integration is the most common navigation technique for land vehicles. Unfortunately, when the GNSS signal is blocked in some areas, such as urban canyons and foliage regions, the navigation solution is degraded due to INS large drift (Shin, 2001). Therefore, this GNSS/INS integration technique should be aided with other sensors to limit the INS drift. These sensors that can be used include sensors such as odometers, magnetometers, Light Detection And Ranging (LIDAR), cameras, Radio Detection And Ranging (RADAR), etc. However, there are some drawbacks associated with using these types of sensors. These drawbacks include the cost, the interference, and the environment requirements. Moreover, motion constraints such as Non-Holonomic Constraints (NHC) are used to enhance the navigation solution (Syed et al., 2008).

Therefore, GNSS/INS integration navigation system should be aided with other sensors to mitigate the large drift of the INS during GNSS signal outage (Niu et al., 2007). Many previous researches used various aiding sensors such as LiDAR (Gao et al., 2015), cameras (Lee et al., 2015), RADAR (Abosekeen et al., 2018), magnetometers (Won et al., 2015), and odometers. There are some disadvantages when using these sensors to aid INS including expense (e.g. LiDAR and RADAR are expensive), a requirement for very high computational and processing capability (as in the case of LiDAR and cameras), the effects of the surrounding environment (e.g. magnetic interference on magnetometers and weather and lighting conditions for cameras), and potentially inaccurate information (e.g. an odometer may provide inaccurate information to the navigation system in some situations such as land vehicle slipping condition) (Wang et al., 2015), or when there is some issues related to the wheels such as the wheels misalignment and unequal wheel diameters (Borenstein, 1996).

To sum up, there is no single sensor that offers a practical and economical solution that aids navigation. Therefore, inclusion of more sensors (preferably low-cost ones) is encouraged to reach more economical and effective integrated navigation solutions.

There are many techniques to estimate the change of heading in land vehicles such as using the Controller Area Network (CAN) bus, which provide the steering angle information from Steering Angle Sensors (SAS) (Salmon 2015). However, this information may not be available in most of cases as it may not be offered by most of On-Board Diagnostic (OBD) units. Other techniques depend on using 3D magnetometers to provide a heading update to the INS navigation solution (Abosekeen et al., 2017). However, this system may be affected by the surrounding environment due to magnetic interference.

Based on the above, there is therefore a need for systems and methods that can be used to assist navigation when GNSS signals are unavailable. Preferably, such solutions can determine a vehicle's heading and, even more preferably, such solutions can determine how far a vehicle has travelled. Such solutions would be even more helpful if they were low cost and easy to use/install.

SUMMARY

The present invention provides systems and methods for use in aiding an inertial navigation system during a GNSS signal outage. Ultrasonic transceivers are positioned adjacent to the wheels of a vehicle and reflections of the emitted signal are used to determine changes of direction or to determine a distance traveled by the vehicle. For changes of direction, the transceiver is adjacent to a front wheel such that left or right turns cause the wheel to interrupt a signal path from the transceiver to a reflector. For distance estimates, the transceiver is adjacent to a back wheel of the vehicle. The ultrasonic signal is reflected from solid sections of the wheel or passes through void sections of the wheel. The obtained measurements can be processed in various ways to estimate number of rotations of the wheel and, accordingly, the distance traveled by the vehicle.

In a first aspect, the present invention provides a system for determining a direction of travel of a land-based vehicle, the system comprising:
  a reflector for reflecting an ultrasonic signal, said reflector being mounted adjacent a wheel of said vehicle;
  an ultrasonic transceiver for producing said ultrasonic signal and for receiving a reflected version of said signal, said transceiver being mounted at a predetermined distance from said reflector;
  wherein
  a round trip time of travel as said signal travels is emitted said transceiver and is received back at said transceiver is dependent upon whether said vehicle is travelling in a straight line, is turning left, or is turning right;
  when said vehicle is travelling in a straight line, said round trip time of travel is at a first value;
  when said vehicle is turning left, said round trip time of travel is at a second value;
  when said vehicle is turning right, said round trip time of travel is at a third value.

In a second aspect, the present invention provides a system for determining a distance traveled by a vehicle, the system comprising:
  an ultrasonic transceiver for producing an ultrasonic signal and for receiving a reflected version of said signal, said transceiver being mounted adjacent a wheel of said vehicle;
  a data processing module receiving an output of said transceiver, said module calculating an estimated number of rotations of said wheel based on a reflection of said signal off of said wheel as said wheel rotates;
  wherein
  said transceiver is positioned adjacent said wheel such that when said transceiver emits said signal as said wheel rotates, said signal is reflected off of solid sections of said wheel and passes through void sections of said wheel.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect of the present invention, a system is provided that would, in the absence or unavailability of a GNSS signal, determine whether a land vehicle is turning left or right as well as estimating the vehicle change of heading. Such a system would, without reference to a GNSS signal, allow a navigation system to determine the vehicle's heading. This system, in one implementation, uses an ultrasonic transceiver (a sensor) mounted adjacent a front or directing wheel of a vehicle and a reflector also mounted adjacent to the wheel. When the vehicle is travelling straight, there is an unobstructed signal path from the transceiver to the reflector and the reflector would reflect the signal generated by the transceiver back to the transceiver. However, when the vehicle is turning left or right, the wheel would obstruct the signal and the signal path (i.e. the path from the transceiver to a reflecting object back to the transceiver) would be different than the signal path when the vehicle is travelling in a straight line. This way, the return travel time of the signal, once processed, can determine whether the vehicle is travelling in a straight line, whether the vehicle has taken a left turn, or whether the vehicle has taken a right turn. Moreover, the vehicle change of heading is estimated.

In another aspect of the present invention, another system is used to determine the distance that a vehicle has travelled using a sensor and the vehicle's wheel. The sensor (an ultrasonic transceiver in one implementation) is directed at the vehicle's wheel and the reflection (or lack thereof) of the signal when directed at either voids or solid sections of the wheel is used to determine how many revolutions of the wheel has occurred. Calibrating the system may need to be performed when a GNSS signal is present to determine how much distance is travelled for every revolution of the wheel but, once calibrated, the system can determine how much distance the vehicle has travelled without reference to a GNSS signal.

In this research, the ultrasonic sensor is used to aid the land vehicle navigation while in a GNSS denied environment by providing change of heading update to the INS through an EKF (Extended Kalman Filter).

Figure 1A:
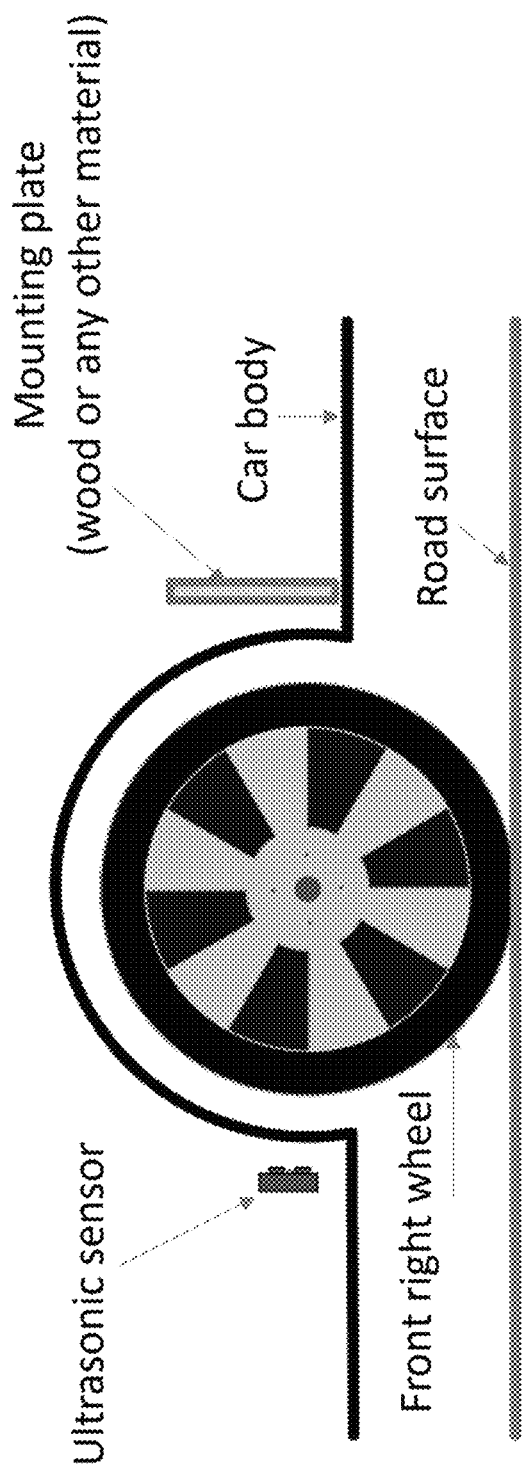
FIGS. 1A and 1B illustrate a system according to one aspect of the present invention.
Figure 1B:
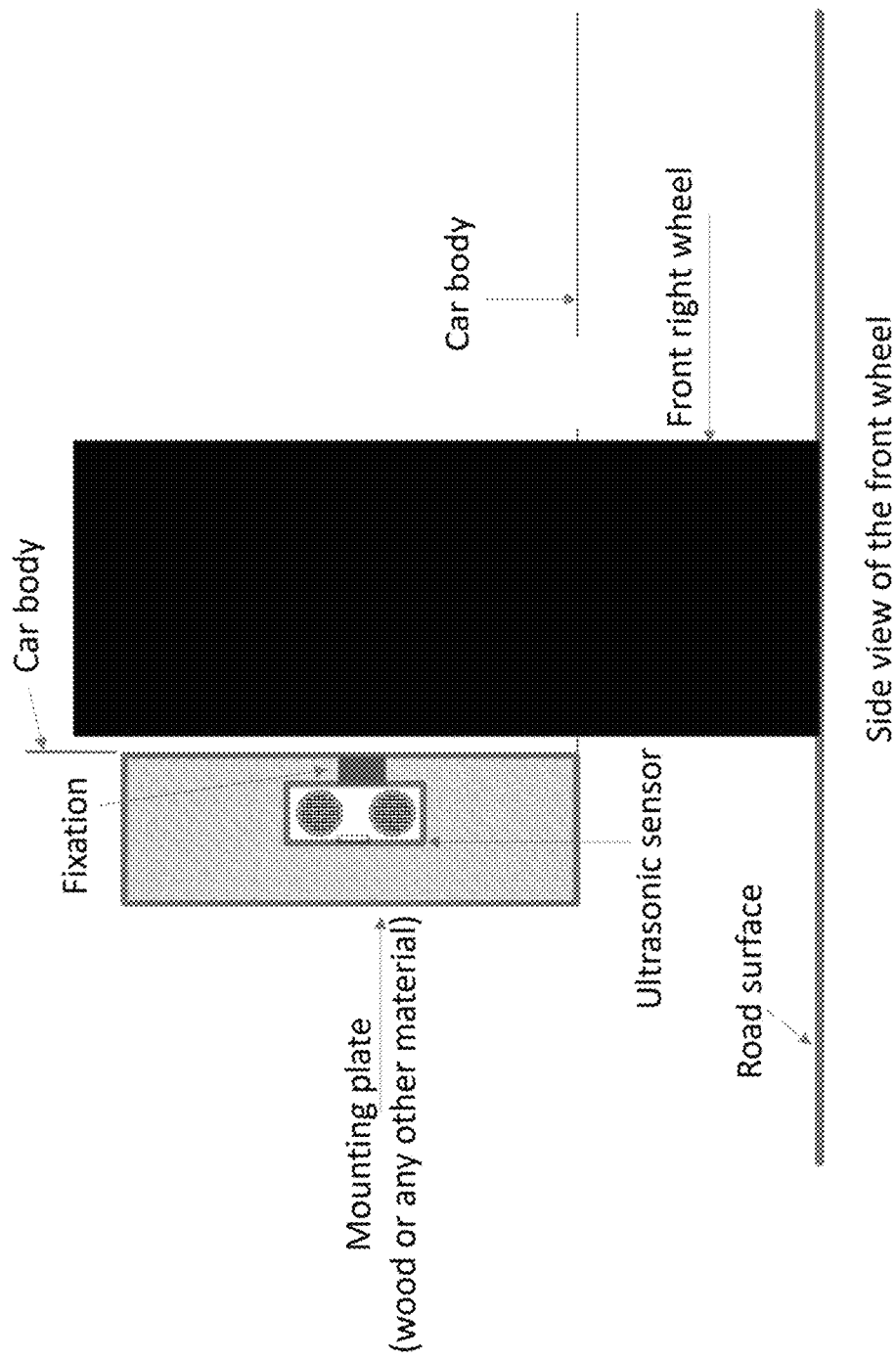
Figure 2:
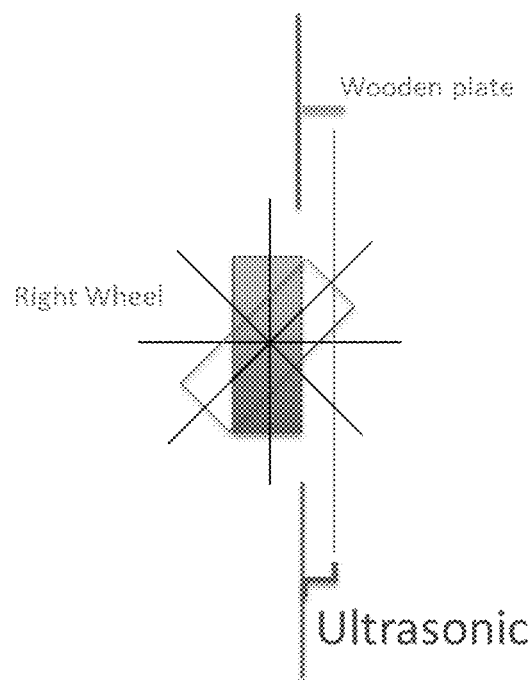
FIG. 2 is a schematic diagram illustrating the system pictured in FIGS. 1A and 1B.

The ultrasonic sensor is mounted on the body of the car facing the direction of the car motion and behind the front right wheel, a wooden surface is mounted on the car body but on the other side of the front right wheel as shown in FIGS. 1A and 1B and in FIG. 2. It should be clear that the system may be mounted behind the front left wheel with minimal changes to the calculations detailed below. As well, it should be clear that the wooden surface acts as a reflector and any other surface using any range of materials may be substituted for the wooden surface. Note that, while the implementation discussed below uses an ultrasonic transceiver, other transceivers that can emit and receive a signal that can be reflected from other surfaces can be used.

The relation between the range sensed by the ultrasonic sensor and the estimated GNSS/INS change of heading during GNSS signal availability is estimated through a linear regression model. During GNSS signal outage, the ultrasonic sensor provides heading change update to the INS navigation solution.

The following discussion has been divided into four subsections as follows: the first subsection discusses the ultrasonic raw data pre-processing; the second subsection addresses the change of heading estimation; the third subsection discusses the integration scheme, and the fourth subsection describes the travelled distance estimation.

Ultrasonic Raw Data Pre-Processing

Figure 3:
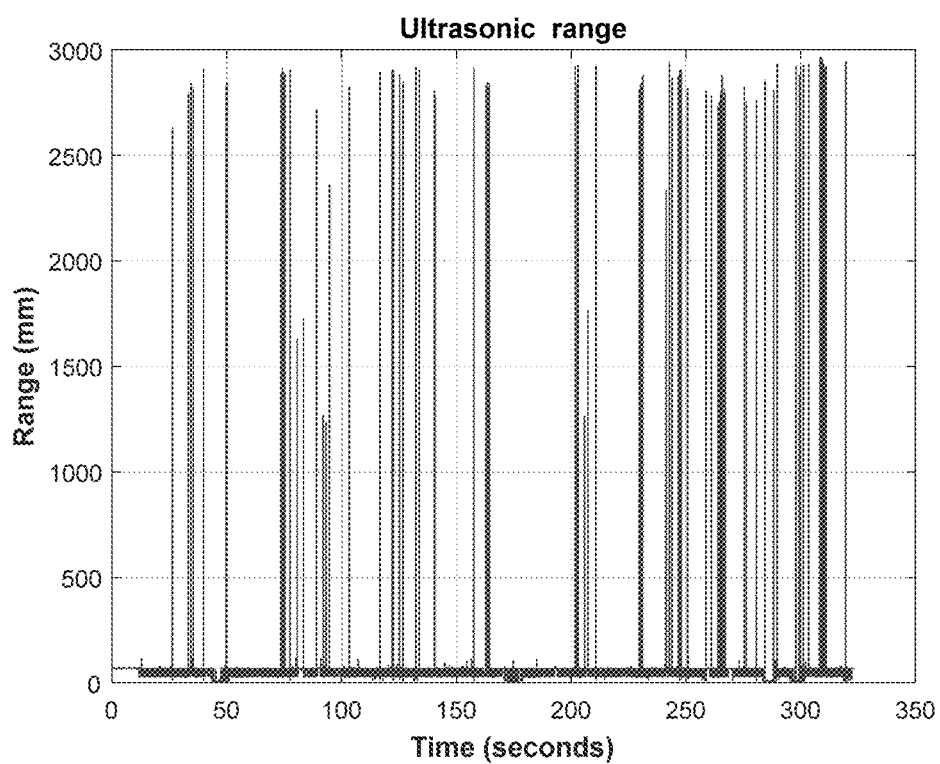
FIG. 3 shows ultrasonic raw data gathered using the system in FIGS. 1A and 1B.
Figure 4:
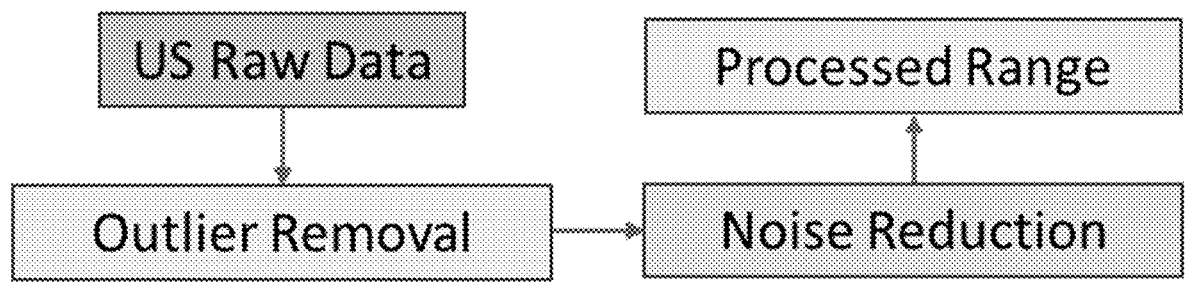
FIG. 4 shows a flowchart detailing data pre-processing for the ultrasonic raw data.

The ultrasonic raw data containing noise and outliers is shown in FIG. 3. Because of the presence of this noise and outliers, the ultrasonic sensor raw measurements are pre-processed to filter out such outliers and the noise. FIG. 4 shows the flow chart of the ultrasonic sensors raw data pre-processing.

Figure 5:
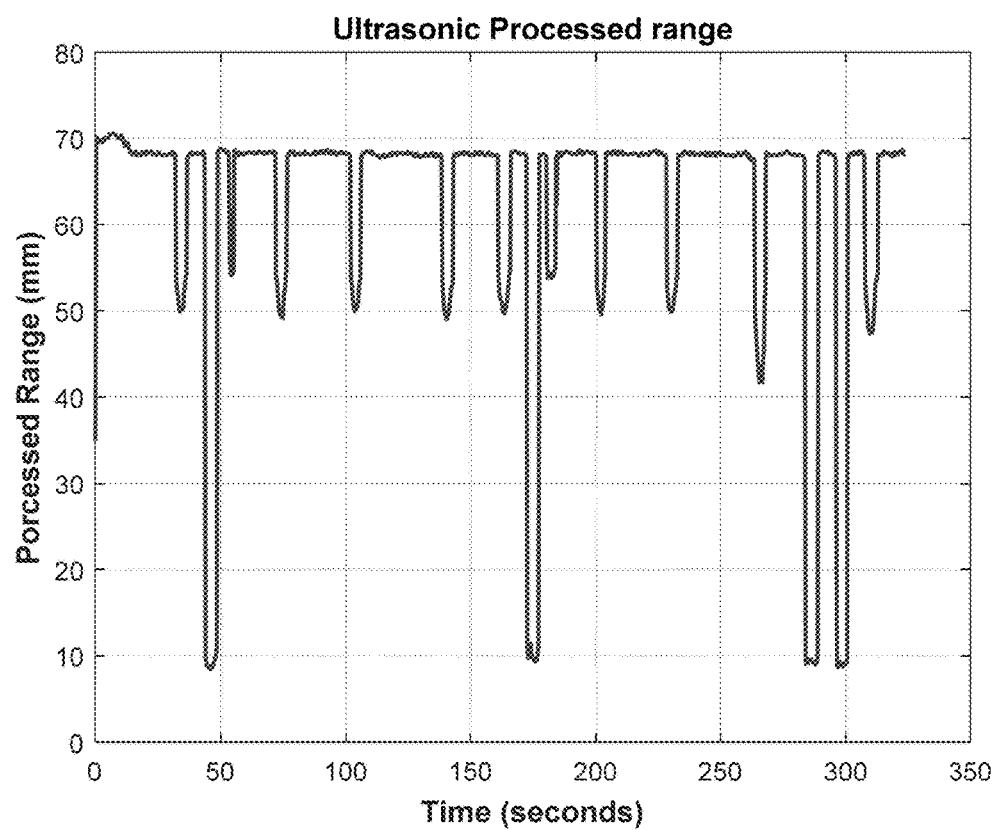
FIG. 5 illustrates the pre-processed data after undergoing the process detailed in FIG. 4.

In the first stage of the data pre-processing is the outlier removal, the blunders are detected when the measured range lies outside the boundaries of the maximum range (between the ultrasonic sensor and the wooden plate) and the minimum range (between the sensor and the wheel when rotated to the left direction). These outliers are then eliminated from the data set. Noise reduction is the second stage of the raw data pre-processing, where a median filter is applied to the raw data to reduce the noise. FIG. 5 shows the ultrasonic processed range.

Change of Heading Estimation

Figure 6:
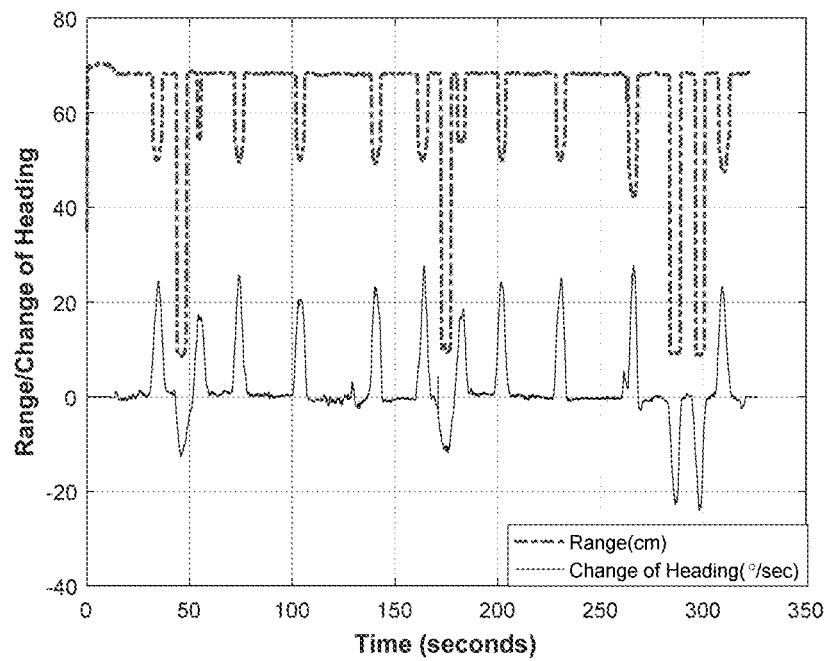
FIG. 6 shows the ultrasonic sensors ranges and the change of heading computed by GNSS/INS integration during the GNSS signal availability for one data set.

During GNSS availability, the change of heading is computed using GNSS/INS integration. The relation between the ultrasonic sensor range and the change of heading is estimated through a linear regression model. FIG. 6 shows the ultrasonic sensors ranges and the change of heading computed by GNSS/INS integration during the GNSS signal availability.

The ultrasonic ranges can be classified into three main categories. The first category is the straight motion category where there is no rotation (i.e. no left or right turn) occurring to the front wheels. The ultrasonic ranges of this category are around 69 cm which is the range between the sensor and the wooden plate. Second category is called the right turn category where the distances between the sensor and the wheel are in range from 42 cm to 55 cm. Finally, the left turn category, the distances are in range between 8 cm to 21 cm.

Figure 7:
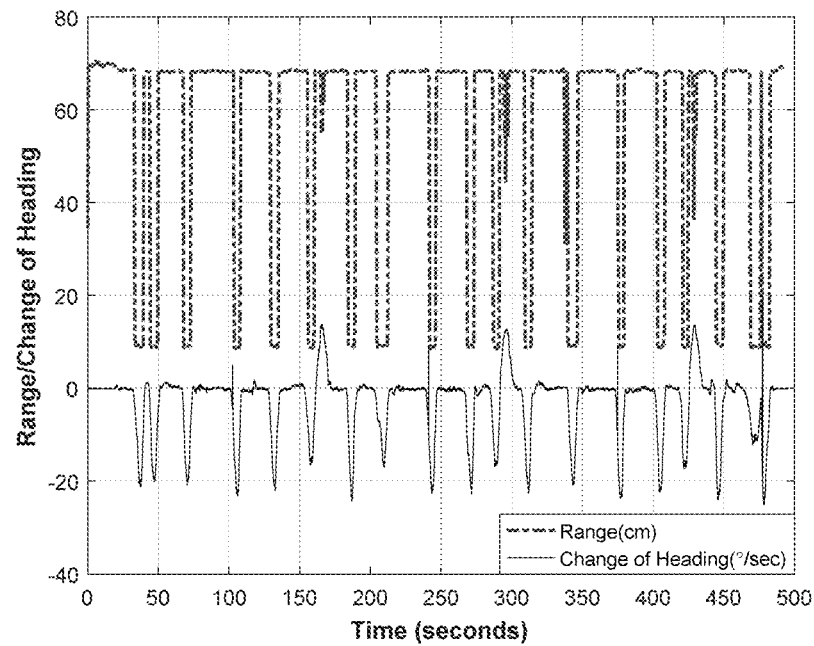
FIG. 7 illustrates the ranges for the other data set to contrast with the data set in FIG. 6.

FIG. 6 shows that there are 11 right turns which are represented as small spikes, and 4 left turns which are illustrated as large spikes. There is a relation between the ultrasonic ranges and the change of heading which can be estimated through a linear regression model for each of the previous three categories. Another data set where the left turn category is dominant is exhibited in FIG. 7.

Figure 8:
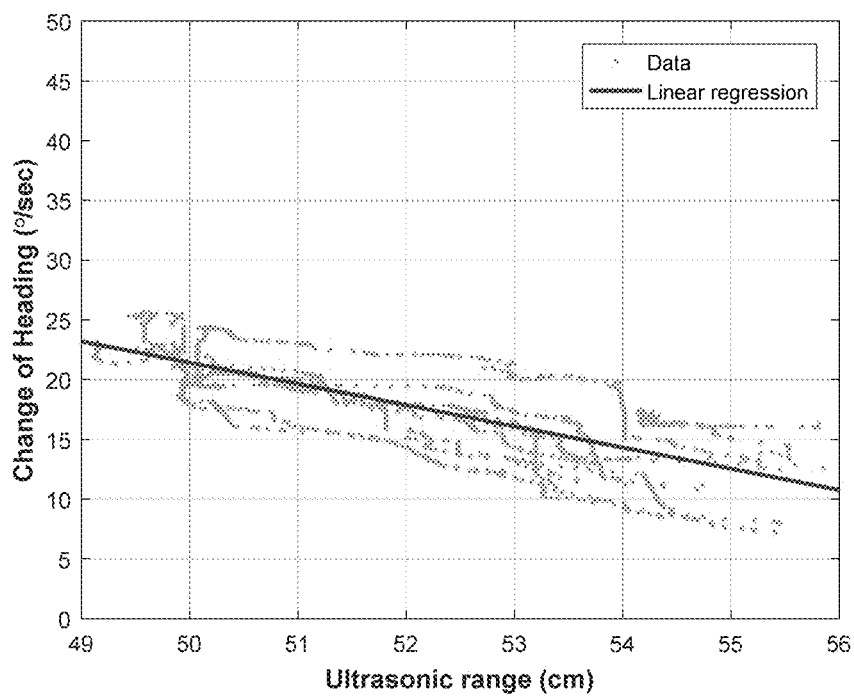
FIGS. 8 and 9 show the linear regression model for left and right turns, respectively.
Figure 9:
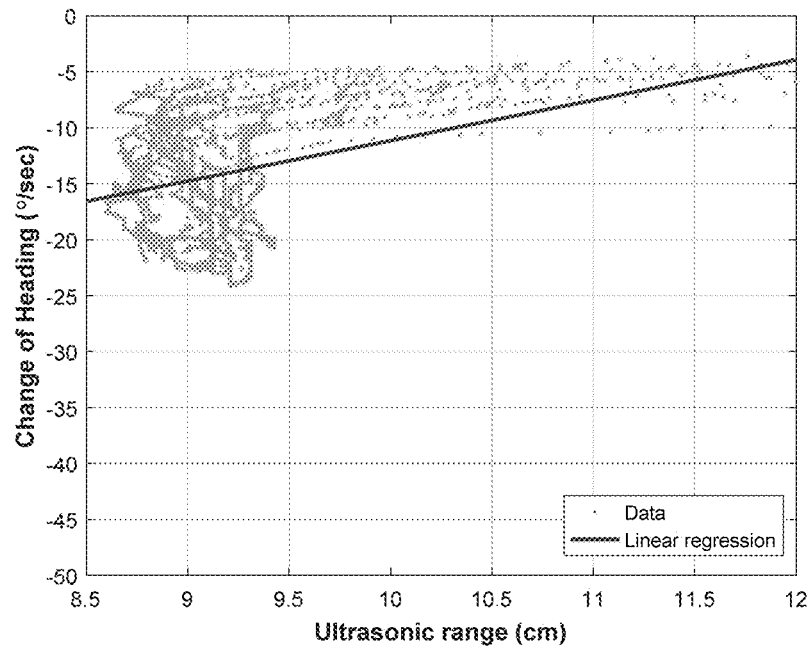

The data for each category is separated from the original data to estimate a regression model for each. The regression model is implemented for half of the data for the first and the second data sets where the first data set will form the regression model of the right turn category and the second data set will create the regression model for the left turn category. FIG. 8 and FIG. 9 show the linear regression model for the right and left turns respectively.

The Root Mean Square Error (RMSE) of the linear regression model for the right turn and left categories are 2.59° and 3.77° respectively.

The ultrasonic aiding system can detect the heading change for angles of more than 10 degrees in case of right turns and more than 4 degrees in case of left turns. However, installing the sensor in a different way may improve the operating range and resolution of the system.

Figure 10:
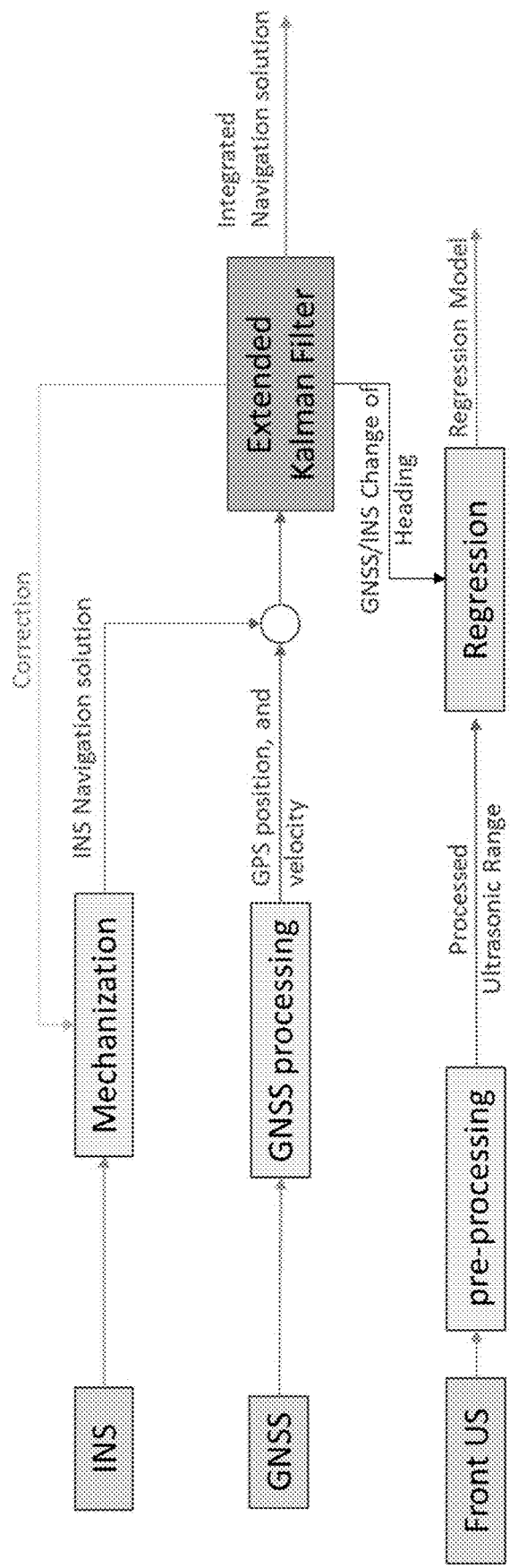
FIG. 10 is a flowchart detailing the steps in a regression model estimation scheme using GNSS signals.

To sum up, the regression models of both the right and the left categories are estimated between the ultrasonic ranges and the GNSS/INS change of heading during GNSS signal availability. The regression model estimation scheme during the presence of GNSS signal is described in FIG. 10.

Figure 11:
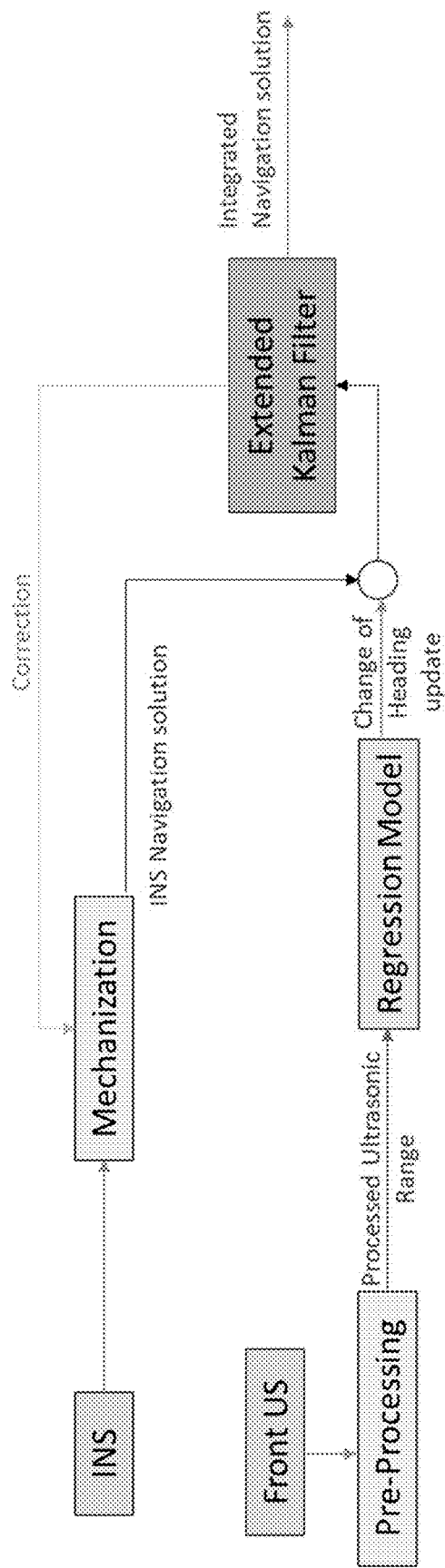
FIG. 11 shows the steps in the integration scheme during a GNSS signal blockage.

During GNSS signal outage, the ultrasonic sensor provides heading change update to the INS standalone navigation solution. FIG. 11 exhibits the INS/Ultrasonic integration scheme during the GNSS signal blockage.

The ultrasonic range is converted to change of heading angle through the regression model during GNSS signal outage. The heading change update aids the INS standalone navigation solution to mitigate its large drift and to provide an enhanced integrated navigation solution.

Figure 12:
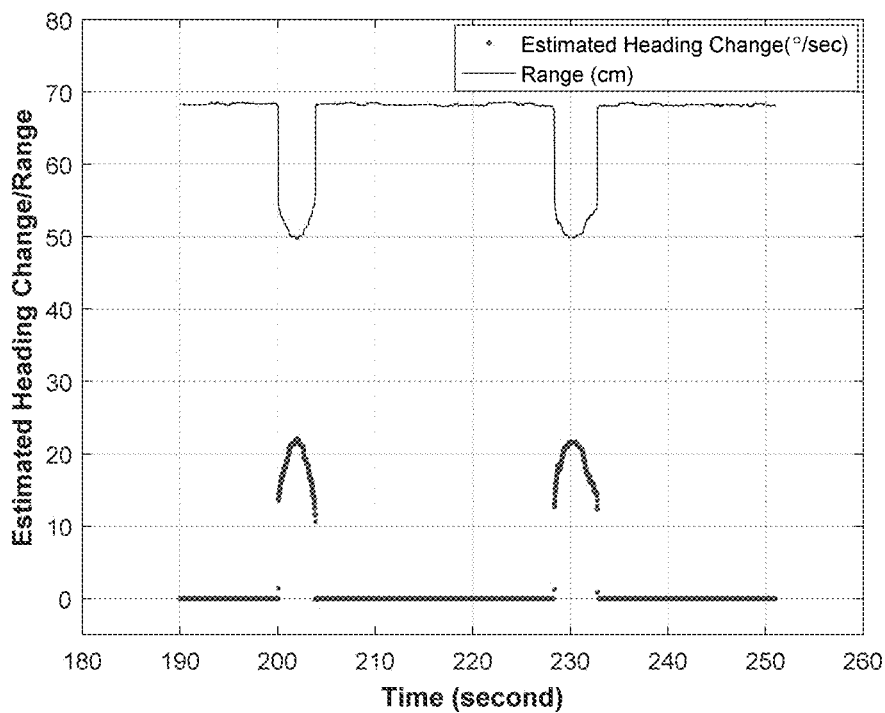
FIGS. 12 and 13 show the ultrasonic processed range and the estimated heading change for right and left turns respectively.
Figure 13:
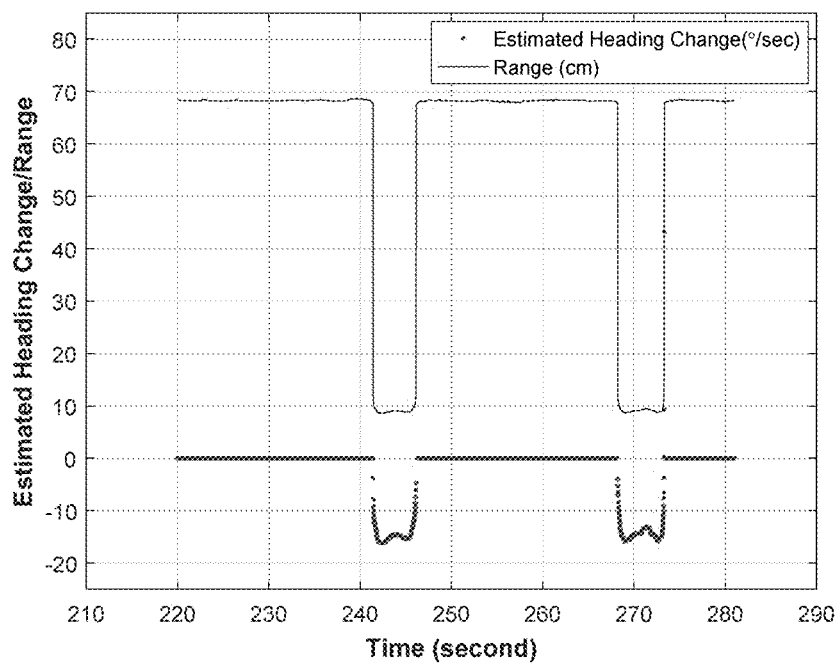

FIG. 12 and FIG. 13 show a sample of the ultrasonic processed range along with the estimated heading change for the right and the left turns categories respectively.

There are sudden changes in the estimated change of heading because of the system's resolution as described before. Therefore, a transition stage is preferably implemented to alter the vehicle's orientation values smoothly from straight motion to sharp turn. The transition stage is created using backward interpolation which is based on the velocity of the turns by keeping the same gradient of the estimated change of heading to reconstruct the values during this stage.

Figure 14:
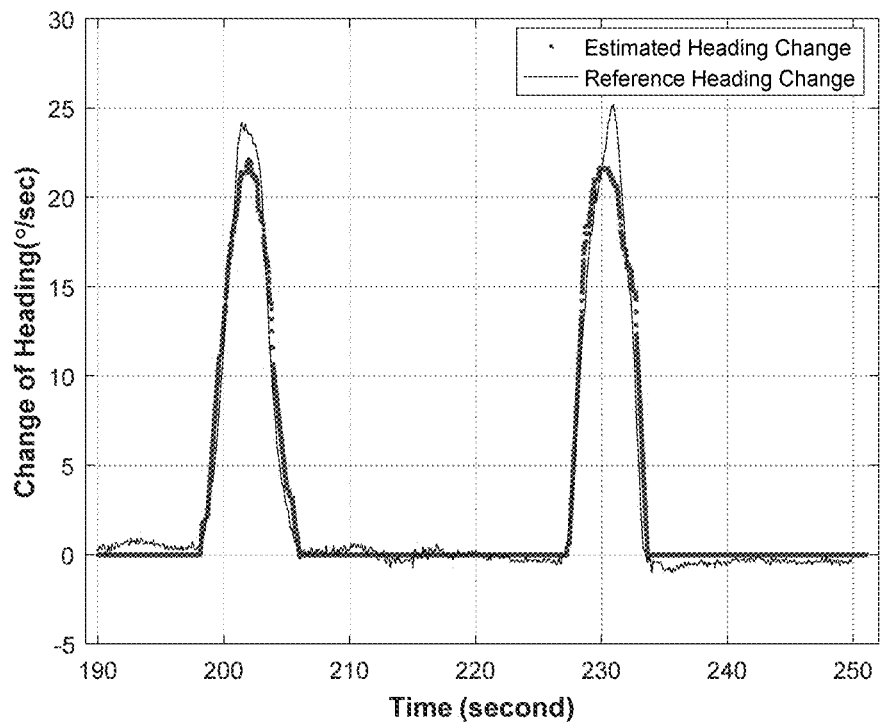
FIG. 14 is a plot for the estimated change of heading and the reference heading change for right turns.

The estimated change of heading and the reference heading change for right turns are plotted in FIG. 14.

The difference between the estimated change of heading and the reference heading change for the right turns are calculated to evaluate the accuracy of the present invention. The RMSE of the estimated change of heading during 60 seconds of the first data is around 1.1°/sec.

Figure 15:
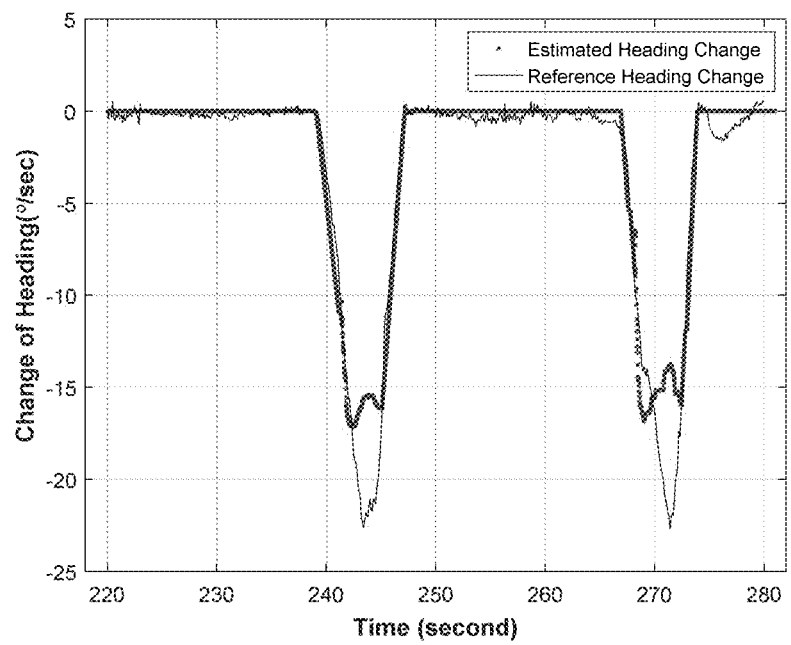
FIG. 15 is a plot for the estimated change of heading and the reference heading change for right turns.

The estimated change of heading and the reference heading change for the left turn category is shown in FIG. 15.

The RMSE of the estimated change of heading during 60 seconds of the second data set is around 1.7°/sec.

Integration Scheme

GNSS/INS loosely coupled integration scheme is implemented in this research where GNSS provides position and velocity updates to INS (Noureldin et. al., 2013) through the use of an Extended Kalman Filter (EKF).

Figure 16:
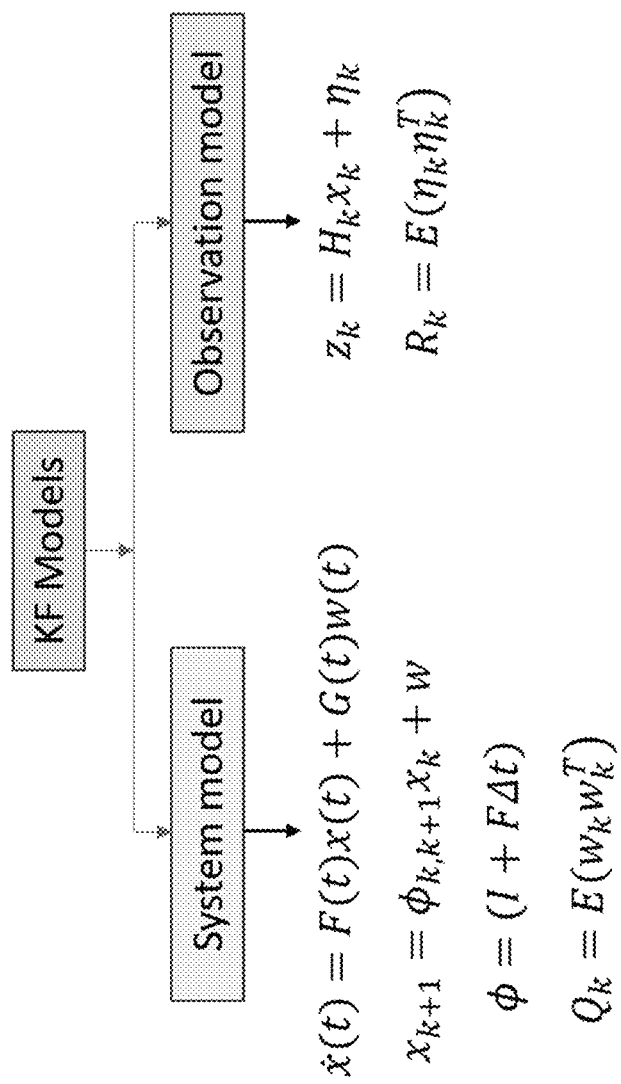
FIG. 16 shows the Kalman filter system and the observation model equations.

EKF consists of two models: the system model and the observation (measurement) model where the system model describes the states evolution with time while the measurement model provides the filter with the updates (Petovello, 2003). The KF system and observation models' equations are described in FIG. 16.

For the system model: ẋ is the time rate of change of the state vector, F is the dynamics matrix, x is the state vector, G is the shaping matrix, and w is the white noise. $\phi_{k,k+1}$ is the transition matrix, I is the identity matrix and $\Delta t$ is the time interval, Q is the process noise matrix which accounts for the uncertainty of the dynamic system model.

For the observation model: $z_k$ is the observation, $H_k$ is the design matrix, $\eta$ is the measurement noise. R is the covariance matrix of the measurement noise which represent the uncertainty of the measurements.

Figure 17:
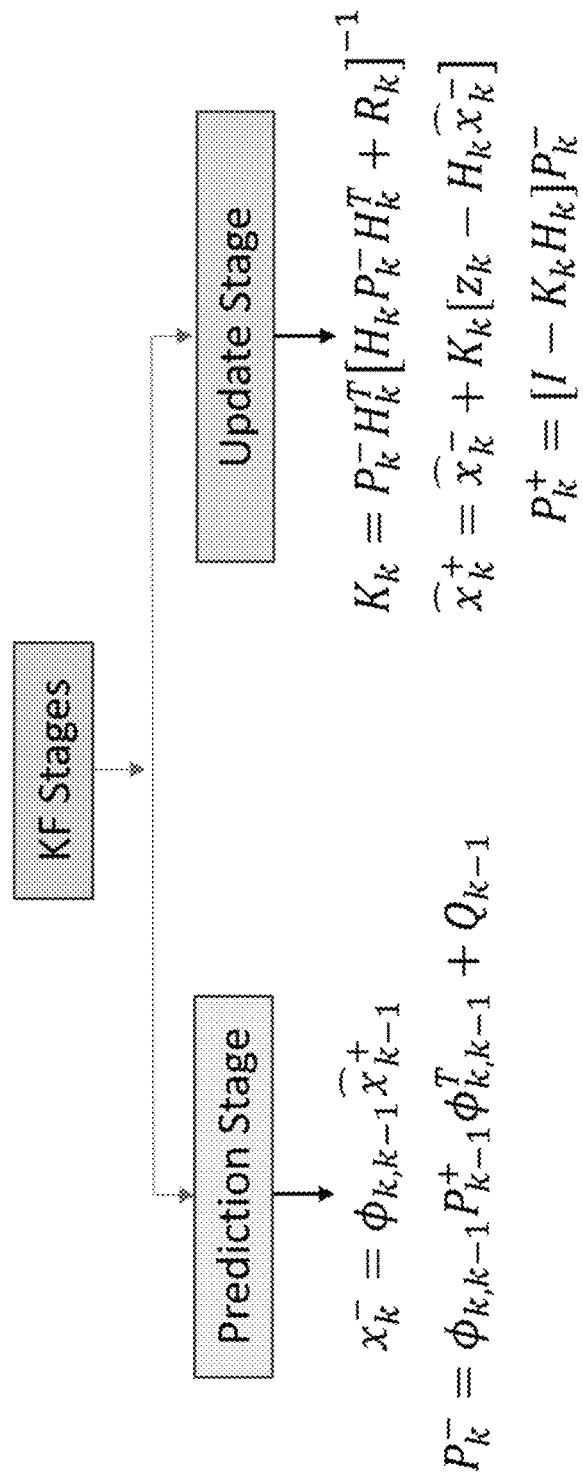
FIG. 17 shows the two stages of the Kalman filter and the equations associated with each of the stages.

KF has two stages which are the prediction stage and the update stage as shown in FIG. 17.

In the equations of FIG. 17, $P_k$ is the covariance matrix of the states, the error states $\delta x$ is described as follows:

$$\delta x_{1 \times 21} = [\delta P_{1 \times 3} \delta v_{1 \times 3} \delta \alpha_{1 \times 3} \text{bias}_{a_{1 \times 3}} \text{bias}_{g_{1 \times 3}} SF_{a_{1 \times 3}} SF_{g_{1 \times 3}}]$$

where $\delta P$ is the 3D position error states, $\delta v$ is the 3D velocity error, $\delta \alpha$ is the attitude angles (roll, pitch, and azimuth) error states, $\text{bias}_a$ is the biases of the accelerometers, $\text{bias}_g$ is the biases of the gyroscopes. Finally, $SF_a$ and $SF_g$ are the scale factor of the accelerometers and gyroscopes respectively.

Figure 18:
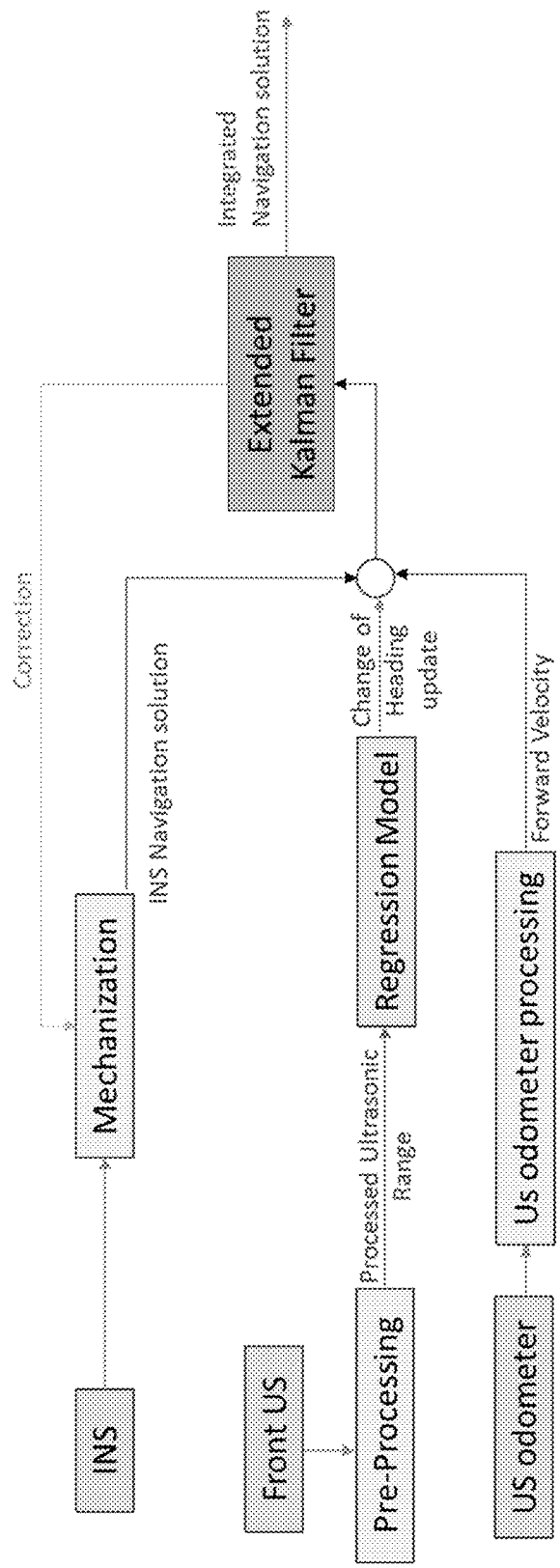
FIG. 18 is a flowchart detailing the integration scheme between the ultrasonic aiding system and INS.

In one aspect of the present invention, the integration scheme between ultrasonic aiding system and INS is described in FIG. 18.

The ultrasonic aiding system consists of the front ultrasonic sensor to estimate the change of heading as described above and the ultrasonic odometer to provide the filter with velocity updates as described in (Moussa et al. 2018). The ultrasonic aiding system integrates with the INS to mitigate its large drift to provide an enhanced integrated navigation solution.

Experimental Setup

Data was collected at Calgary City using Pixhawk (Px4) board which is composed of a U-blox GPS and Invensense MPU-6000 and installed on the roof of a Ford Focus car. In addition to this, the system uses an ultrasonic sensor (HC-5R04) that is connected to an Arduino Uno R4 embedded board. The ultrasonic sensor is mounted facing the direction of the car motion behind the front right wheel and a wooden plate which is located on the other side of that wheel, this distance between the sensor and the plate being kept constant for all the experimental tests. The sensor measures this fixed range when the car does not change its orientation. On the other side, when the right front wheel rotates to the right, the ultrasonic sensor will sense a range less than the range measured when the wheel is in a straight direction, but this range is more than the range measured by the sensor when the wheel is rotated to the left direction.

Two experimental data sets were collected, where the first data set is dominated by sharp right turns, while the second is dominated by sharp left turns. These data sets were used first to estimate the regression model (half of the data set) as described before in the methodology section and in providing a navigation solution using the navigation system of the present invention.

The navigation solution is estimated using loosely coupled GNSS/INS integration for all the trajectory for both data sets and then a simulated GNSS signal outage is selected on different periods to show the impact of the ultrasonic aiding system of the present invention on the final solution during this outage.

Figure 19:
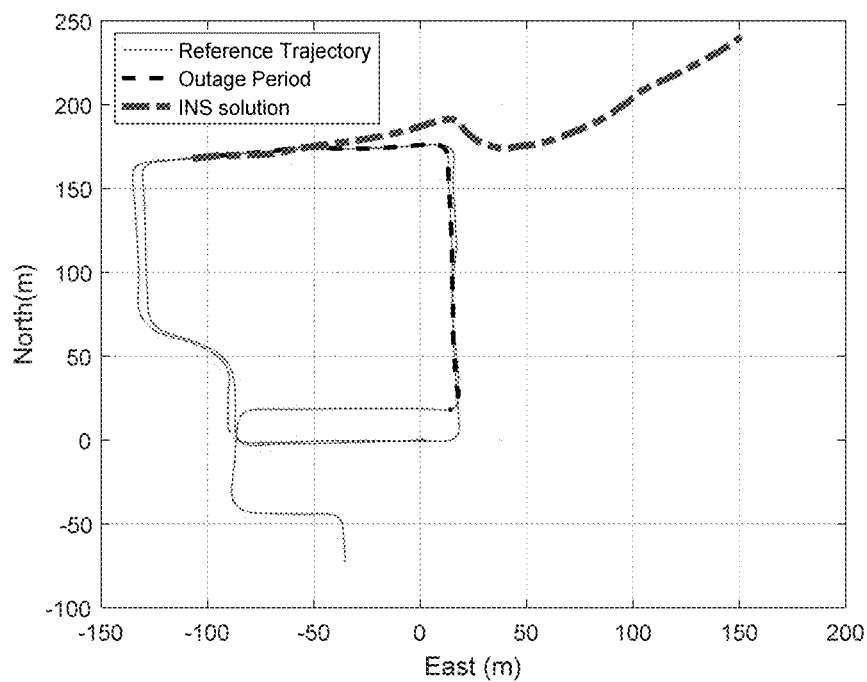
FIG. 19 shows the first trajectory INS standalone navigation solution for 60 seconds GNSS signal outage.
Figure 20:
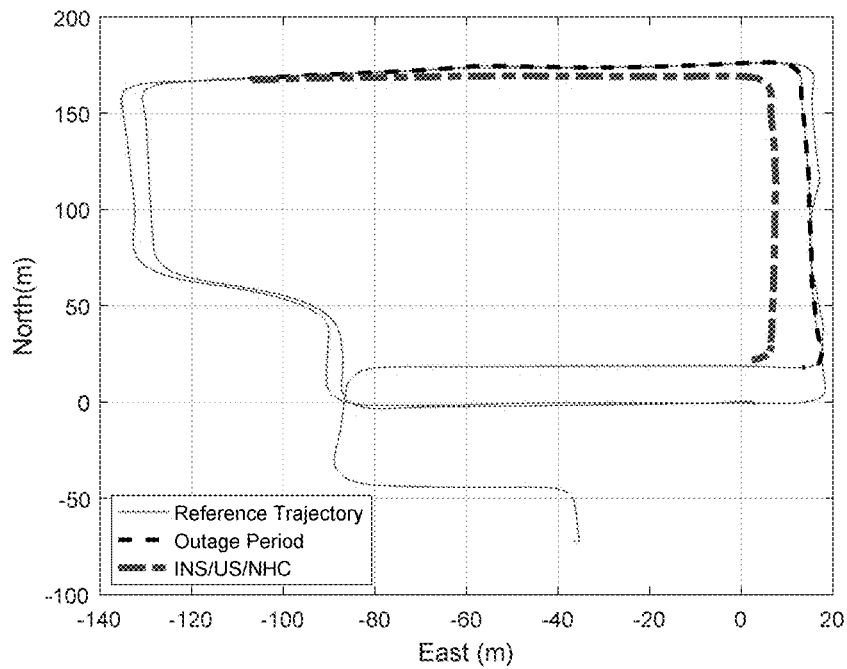
FIG. 20 shows the first trajectory INS/Ultrasonic velocity and heading change updates/NHC navigation solution for 60 seconds GNSS signal outage.

The RMSE for the INS standalone navigation solution was 110 meters for a 60 second GNSS signal outage of the first data set as shown in FIG. 19. FIG. 20 shows that the RMSE is enhanced to around 9.70 meters when applying the change of heading update along with the velocity update and NHC.

Different GNSS signal outages are simulated for different periods and Table 1 shows the average position RMSE results from different navigation solution methods for the first data set for 60 seconds GNSS signal outage. Table 1 shows the average position RMSE for the first data set for different 60 seconds GNSS signal outages for different updates and constraints.

TABLE 1

| Navigation solution method | RMSE (m) |
| --- | --- |
| INS standalone solution | 135 |
| INS/NHC | 17.55 |
| INS/V update/NHC | 10.05 |
| INS/V update/NHC/Heading updates | 8.96 |

The ultrasonic change of heading update enhances the navigation solution when integrated with INS along with velocity updates and NHC to around 9 meters RMSE instead of 17.55 meters RMSE in case of INS/NHC and 10.05 meters RMSE for INS/NHC/velocity update estimated navigation solution.

Figure 21:
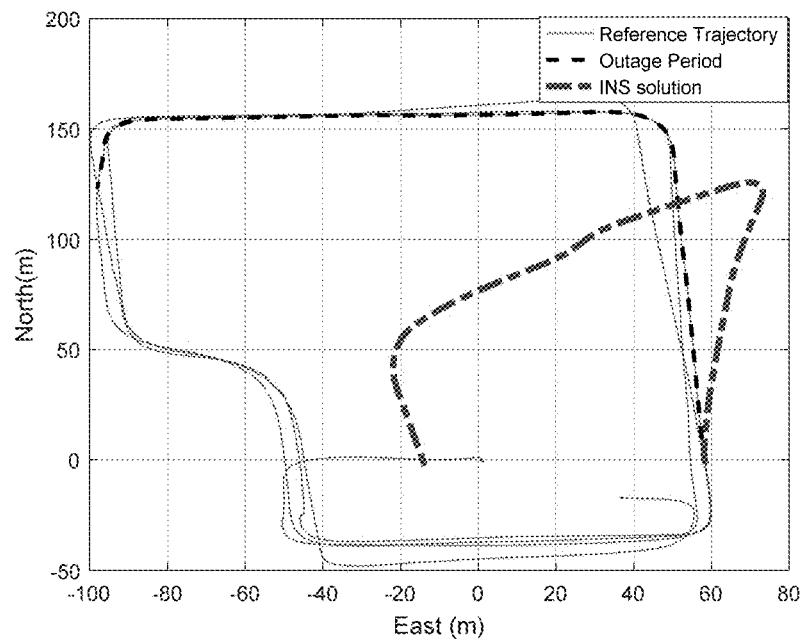
FIG. 21 shows the second trajectory INS standalone navigation solution for 60 seconds GNSS signal outage.
Figure 22:
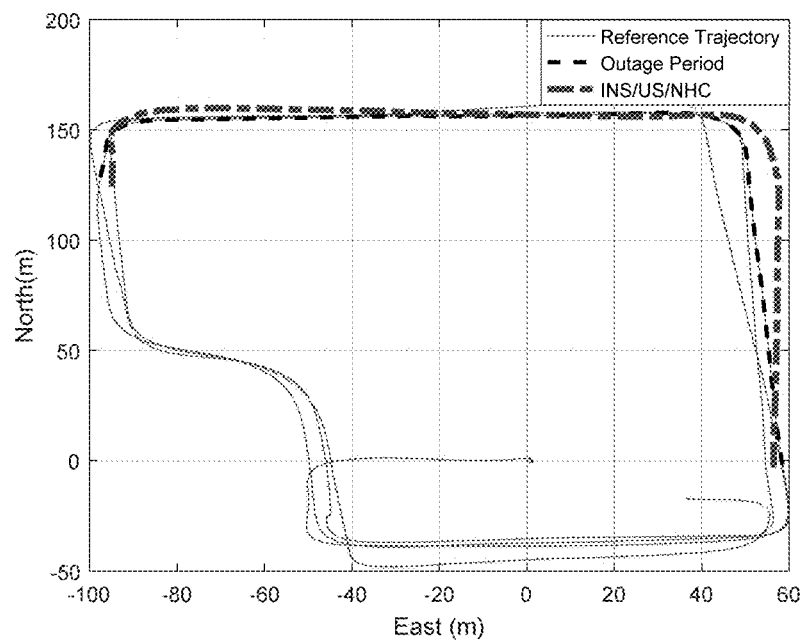
FIG. 22 shows the second trajectory INS/Ultrasonic velocity and heading change updates/NHC navigation solution for 60 seconds GNSS signal outage.

The second data set is for another trajectory where it has sharp dominant left turns. The RMSE of the estimated position is around 74 meters for the INS standalone mode for 60 seconds GNSS signal outage as shown in FIG. 21 while the RMSE is improved to around 7 meters when applying the change of heading update to INS as shown in FIG. 22.

The position RMSE for different estimated navigation solution methods is listed in Table 2 for the second data set for 60 seconds GNSS signal outage. Table 2 details the position RMSE for the second data set for 60 seconds GNSS signal outage for different updates and constraints

TABLE 2

| Navigation solution method | RMSE (m) |
| --- | --- |
| INS standalone solution | 73.74 |
| INS/NHC | 15.49 |
| INS/V update/NHC | 8.97 |
| INS/V update/NHC/Heading updates | 7.11 |

Table 2 shows that the integration of the INS with the ultrasonic aiding system along with NHC mitigating the INS large drift where the position RMSE in enhanced to 7.11 meters instead of 74 meters for the INS standalone solution. The estimated navigation solution is improved when applying the change of heading update along with the velocity update and NHC rather than applying the velocity update and NHC only.

The system of the present invention, along with other common updates such as velocity update and Non-Holonomic Constraint, enhances the position states by around 90% for a 60 second GNSS signal blockage. The ultrasonic aiding system has many advantages such as it is a very low-cost sensor and it has a high data rate that reaches around 92 Hertz. The aiding system of the present invention may be used to calibrate the gyroscopes of the INS during a GNSS signal outage.

Travelled Distance Estimation

Figure 23A:
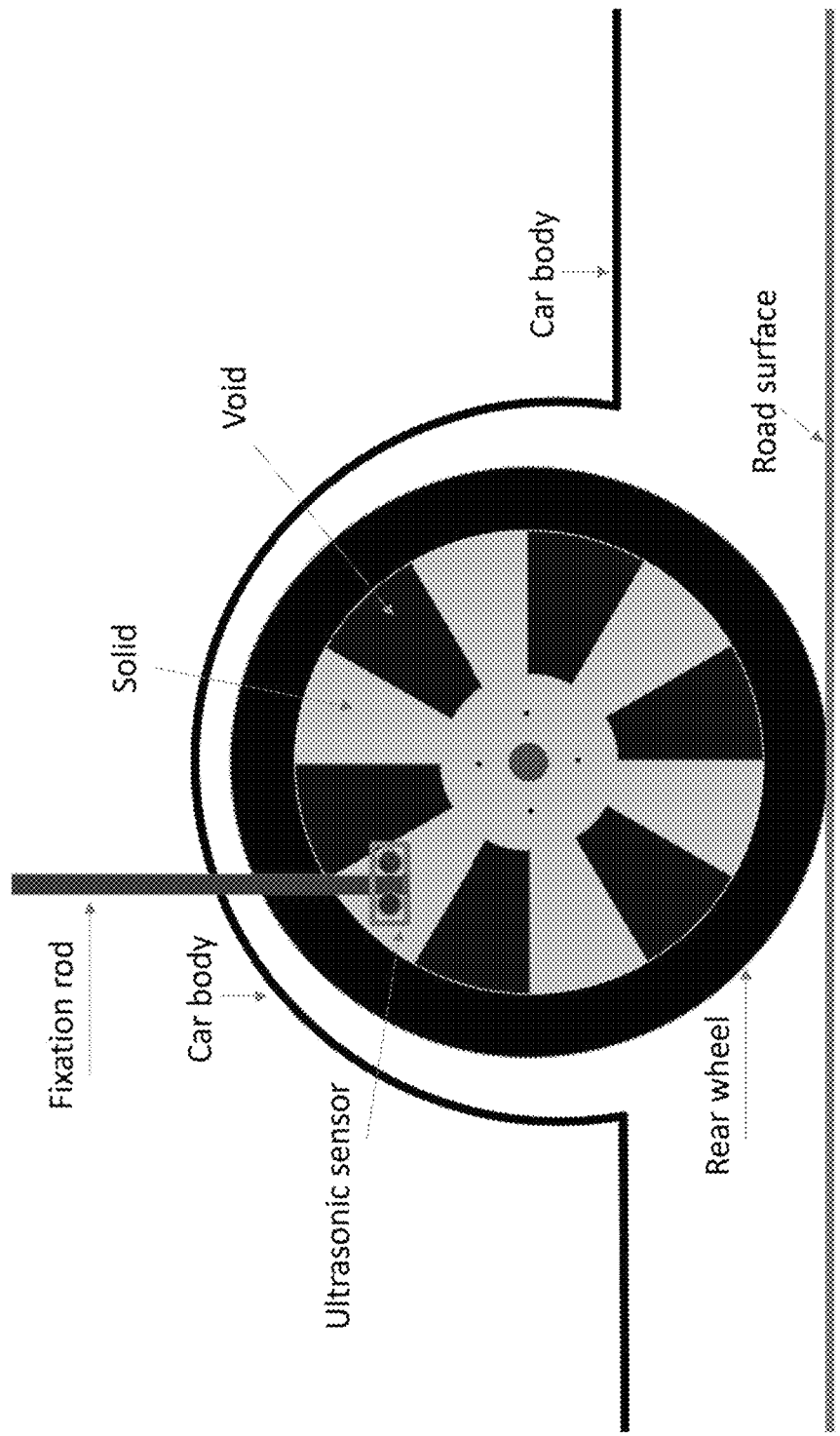
FIGS. 23A and 23B show the installation of a system for determining travel distance.
Figure 23B:
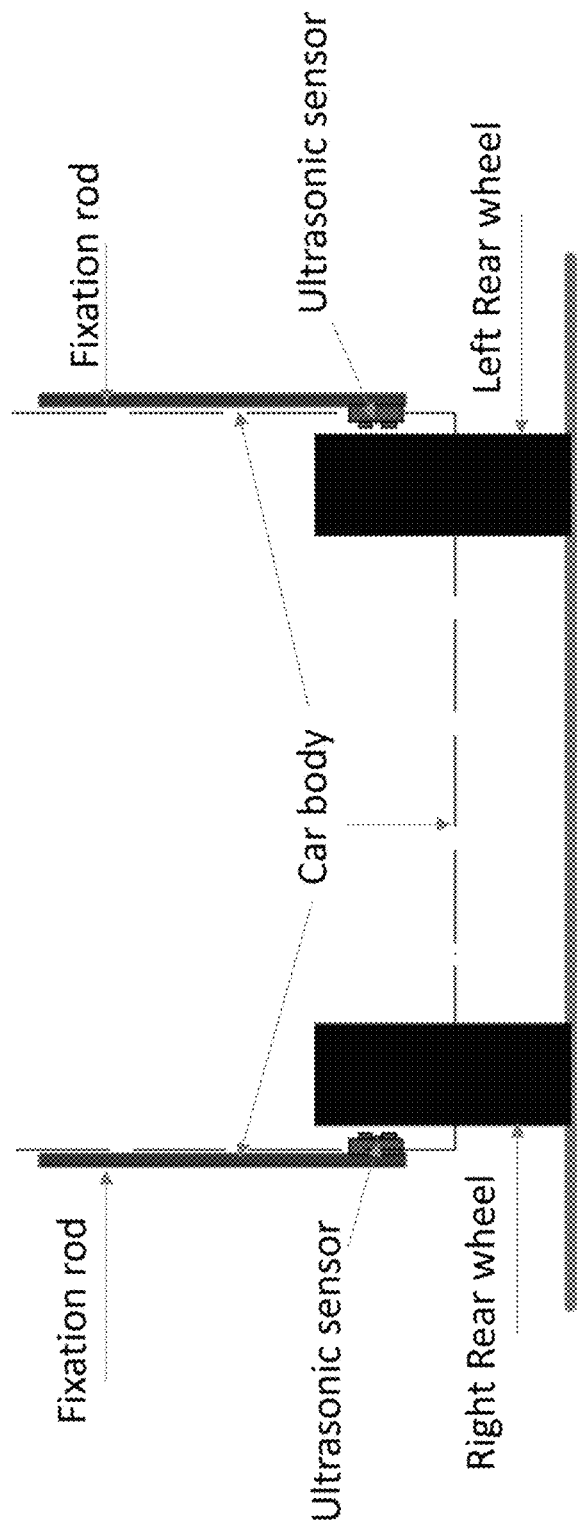

It should be noted that the system described above uses an ultrasonic sensor mounted adjacent to one of the front wheels of a vehicle. The system described above estimates the change in direction of the vehicle. To determine the distance traveled by the vehicle, another system as described below may be used. In this other system, the ultrasonic sensor is mounted on the vehicle body facing the wheel rim to sense the range between the sensor and the solid and void parts of the wheel rim to estimate the angular velocity of the wheel and then to determine the vehicle forward velocity. FIGS. 23A and 23B show the ultrasonic sensor installation. As can be seen, the system in this implementation mounts an ultrasonic sensor adjacent a rear wheel of a vehicle.

The angular velocity is a function of the time difference between successive transitions of the solid and the void parts as well as the number of the transitions which is equal to half the number of the solid and void parts. The wheel rim parameters should be known a priori, and these parameters include the number of the solid and void parts of the rim. These parameters are used to estimate the angular velocity of the wheel and then to calculate the velocity of the land vehicle. Moreover, the shape of the wheel void and solid parts should be symmetrical.

The forward velocity of the vehicle may be estimated using the setup illustrated in FIGS. 23A and 23B and using three different approaches:
  a first method (rim geometry-based method) that uses the symmetry of the rim and the a priori knowledge of the number of the solid and the void parts;
  a second method (dynamics-based method) that is considered to be a general method as it does not require either the number of the solid and void parts or the a priori knowledge of the shape of the rim (regardless of symmetry or asymmetry of the wheel rim);
  a third method (frequency-based method) that is a general method which depends on the spectrogram concept, where the wheel rim parameters are not required to estimate the land vehicle forward velocity.

Rim Geometry-Based Method

Figure 24:
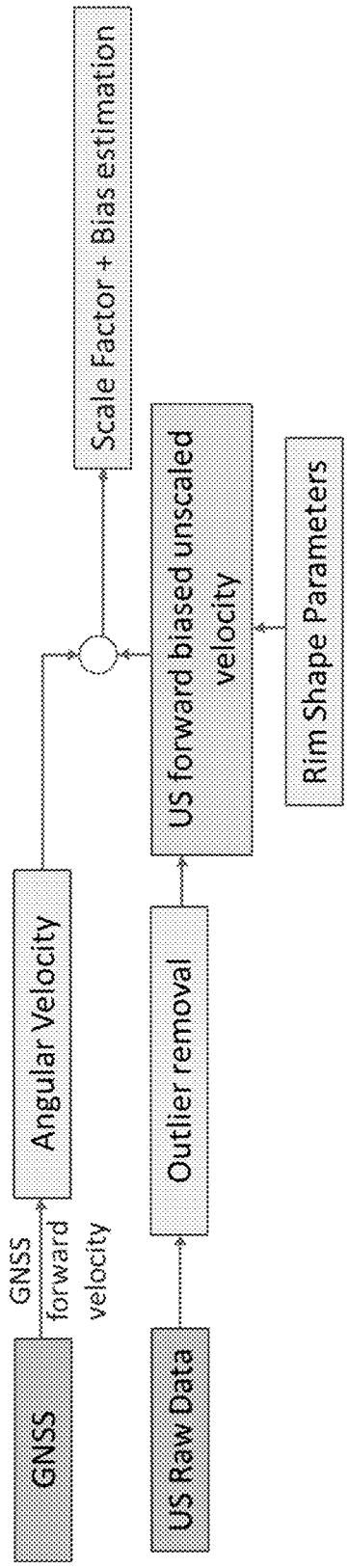
FIG. 24 is a flowchart detailing the steps for a rim-geometry based method to be used during GNSS signal availability
Figure 25:
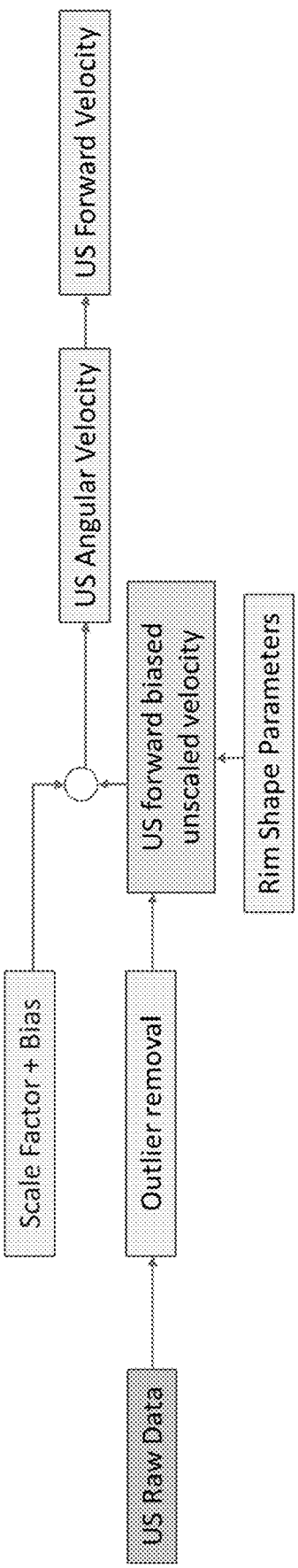
FIG. 25 is a flowchart detailing the steps for a rim-geometry based method to be used during a GNSS signal outage.

The Rim Geometry-based method is applied only in situations where there is a symmetric wheel rim shape and the method uses the pre-knowledge of the rim shape parameters. Moreover, it requires the availability of the GNSS signal for a certain period to estimate the bias and scale factor. FIG. 24 is a flowchart detailing this method during GNSS signal availability. FIG. 25 is a flowchart detailing this method during a GNSS signal outage.

After the ultrasonic raw data processing, the time difference between successive transitions ($\Delta t$) is used to calculate the RPS through equation (1). The forward velocity of each wheel is computed separately as shown in equation (2) in which the diameter of the wheels is measured through linear measurements to account for the unequal wheel diameters.

$$RPS = \frac{1}{n}\left(\frac{1}{\Delta t}\right) \qquad (1)$$

$$velocity = \pi * wheeldiameter * RPS \qquad (2)$$

where n is the number of solids or voids in the wheel rim.

During GNSS signal availability, the ultrasonic-based system estimates the forward velocity with the aid of the rim shape parameters. However, this velocity is contaminated with biases and scale factor. The GNSS provides forward velocity to the system and both the scale factor and the bias are estimated.

During GNSS signal outage, the ultrasonic sensor uses the estimated scale factor and the biases to determine the land vehicle forward velocity.

Dynamics-Based Method

Figure 26:
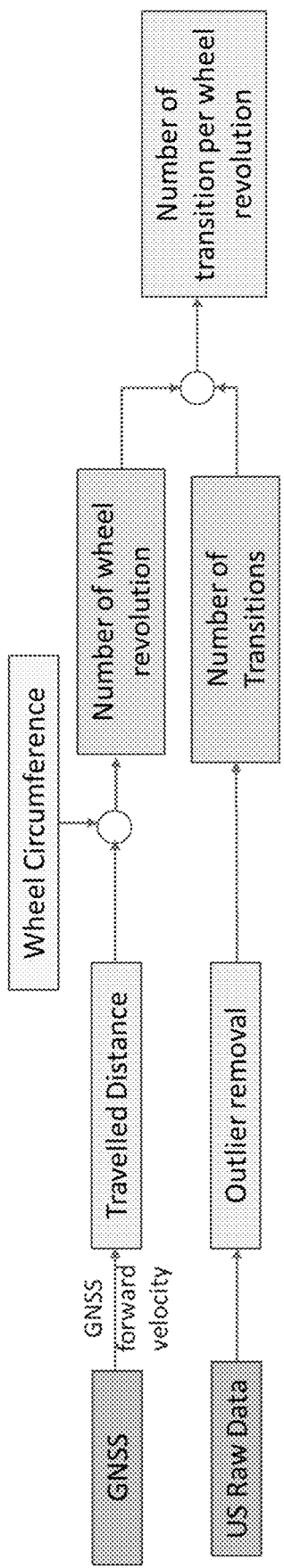
FIG. 26 is a flowchart detailing the steps in a dynamics-based method for estimating transition numbers per wheel revolution during GNSS availability.

This method requires the availability of the GNSS signal for some time to estimate the number of the transitions per wheel revolution where the number of the wheel revolutions are estimated by the GNSS while the number of the transitions between the solid and the void parts are determined from the ultrasonic sensor. FIG. 26 shows the flowchart for the estimation of transition numbers per wheel revolution during GNSS availability.

Figure 27:
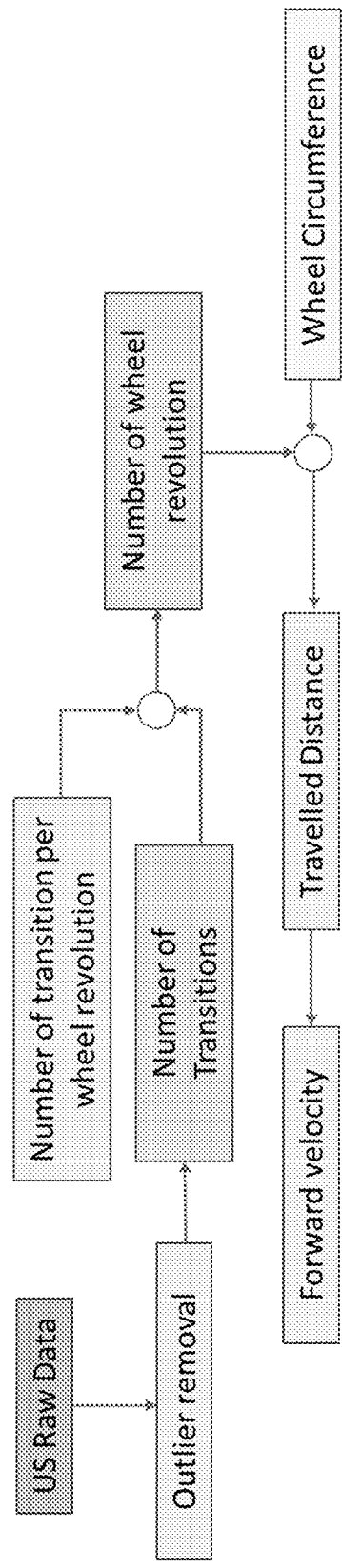
FIG. 27 is a flowchart detailing the steps in a dynamics-based method for estimating transition numbers per wheel revolution during a GNSS outage.

During GNSS availability, GNSS forward velocity is integrated to estimate the traveled distance, then the traveled distance is divided by the wheel circumference to determine the number of wheel revolutions. On the other hand, the ultrasonic sensor estimates the number of transitions between the solid and void parts. Finally, the number of the transition per revolution is estimated during the GNSS availability. FIG. 27 exhibits the flowchart of the velocity estimation using an ultrasonic sensor during GNSS signal outage.

During GNSS signal outage, the number of the transitions estimated by the ultrasonic sensor is divided by the number of the transition per revolution to determine the number of the wheel revolution to estimate the distance traveled and then the vehicle forward velocity is determined.

Frequency-Based Method

Figure 28:
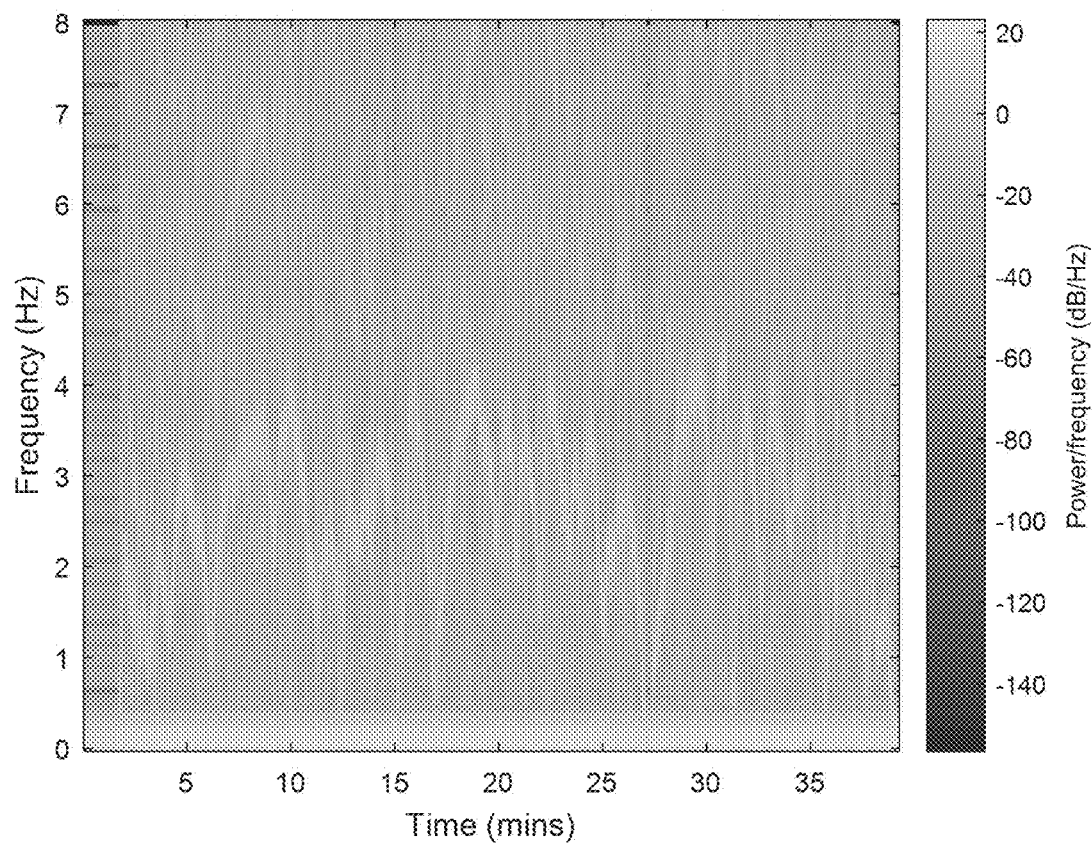
FIG. 28 shows a spectrogram for use in a frequency-based method for angular velocity estimation.

The frequency-based technique is based on the Spectrogram concept in which the wheel angular velocity is estimated without the pre-knowledge of the wheel rim parameters. The spectrogram is a short time Fourier transform (ultrasound range measurements) where the signal can be 3D represented where the x-axis represents the time while the y-axis represents the frequency of the signal and finally the power is represented in color scale. FIG. 28 shows a spectrogram for an ultrasonic sensor signal.

Figure 29:
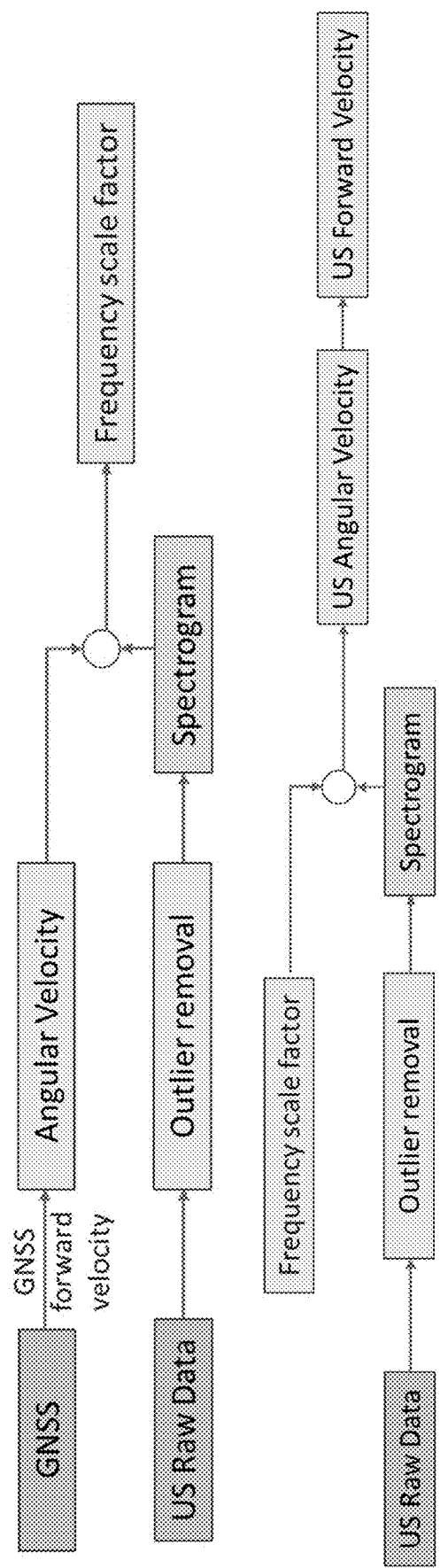
FIG. 29 is a flowchart detailing the steps in the frequency-based method for estimating angular velocity.

The spectrogram is a function of different parameters such as the window, the overlap of the samples and the sampling frequency. The Hamming window is used along with a segment of 70 samples with 50% overlap between consecutive segments. FIG. 29 shows the flowchart of the frequency-based method estimation of the vehicle forward velocity using ultrasonic sensor. As can be seen in FIG. 29, the frequency scale factor is first determined, and this is then used to determine the forward velocity.

During GNSS signal availability, The GNSS provides the system with the vehicle velocity and therefore the revolution per second of the vehicle's wheel can be calculated. This will provide the scale parameter of the frequency of the spectrogram. During GNSS signal outage, the spectrogram will use the scale factor to estimate the forward velocity of the vehicle regardless of the shape and the number of the void and solid parts of the wheel rim.

Experimental Setup

Figure 30A:
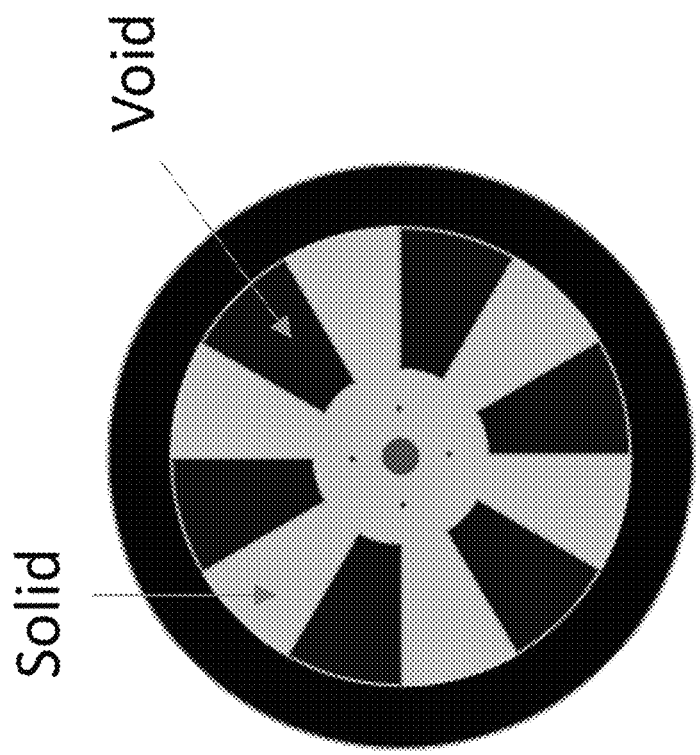
FIGS. 30A and 30B show the symmetric and asymmetric rim shapes that were used in the methods of the present invention.
Figure 30B:
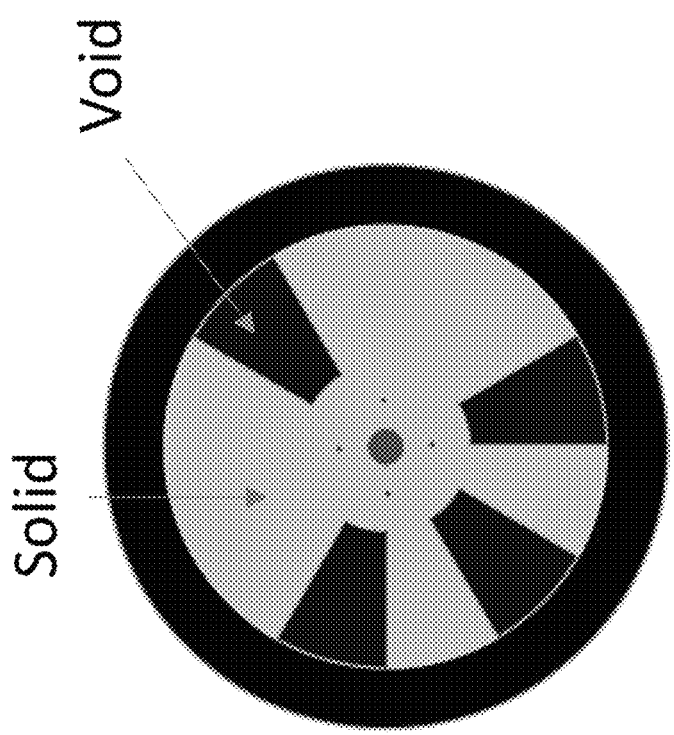

Real data was collected at the University of Calgary region where an ultrasonic sensor (HC-SR04) is connected to an Arduino Uno R4 embedded board (other data processing devices or modules may, of course, be used). The sensor is mounted facing the rear wheel. During the car motion, the ultrasonic sensor measures the ranges to both the solid and the void parts of the rim and a pulse wave is formed. The data was collected by Pixhawk (Px4) board which consists of a U-blox GNSS and an Invensense MPU-6000. The studied symmetric and asymmetric rim shapes as shown in FIGS. 30A and 30B.

Rim Geometric-Based Estimation Method for the Symmetric Rim Datasets

Figure 31:
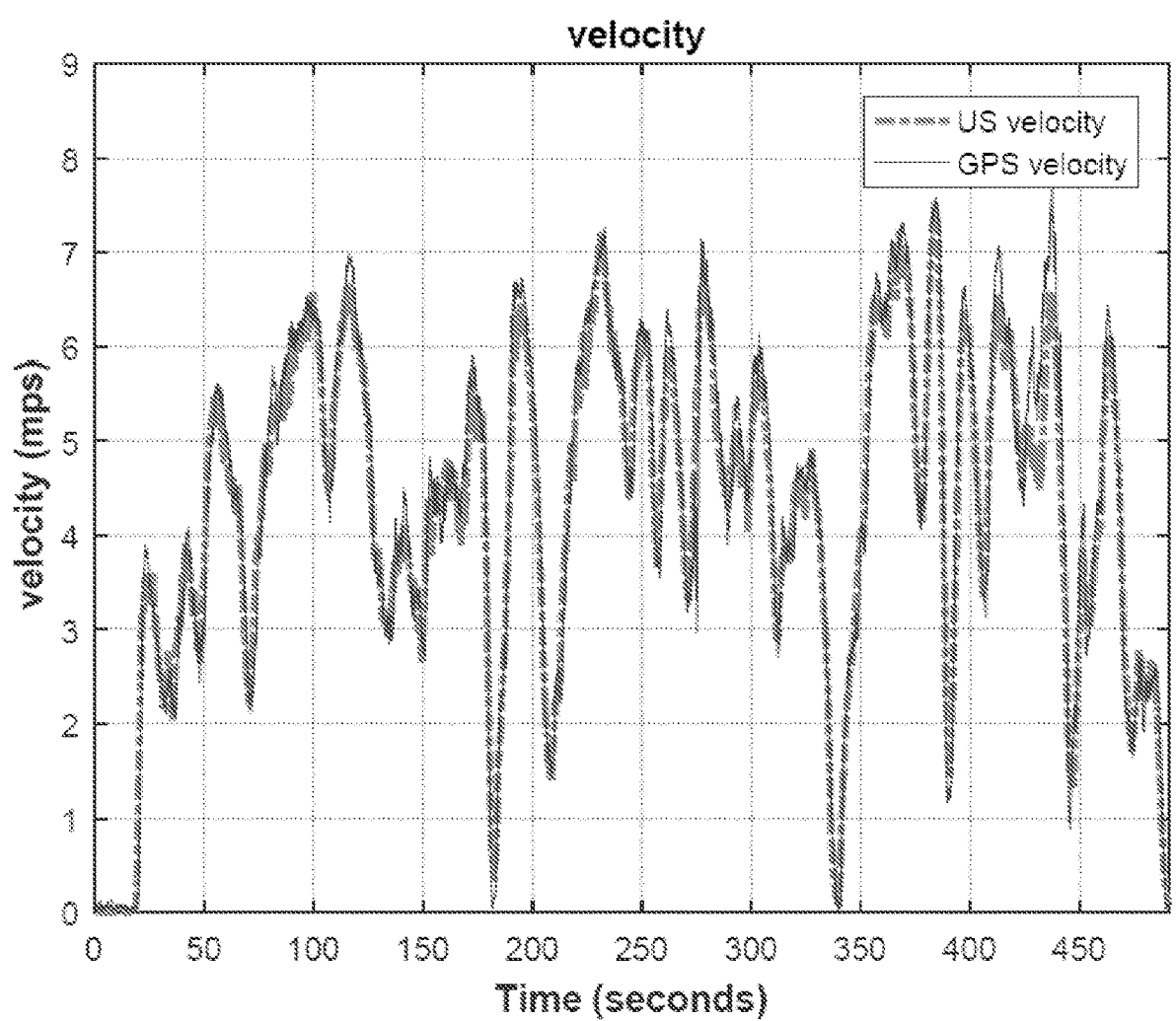
FIG. 31 show the data results for velocity estimation using rim geometry-based estimation method for symmetric rim data sets.

The GNSS provides the scale factor and the biases and then the ultrasonic sensor uses these to estimate the vehicle forward velocity. The rim geometric-based velocity and the GNSS velocity for the symmetric rim datasets is shown in FIG. 31.

The difference between the GNSS velocity and the ultrasound velocity are calculated to assess the accuracy of the method. The Root Mean Square Error (RMSE) of the estimated velocity is around 0.28 m/sec.

Figure 32:
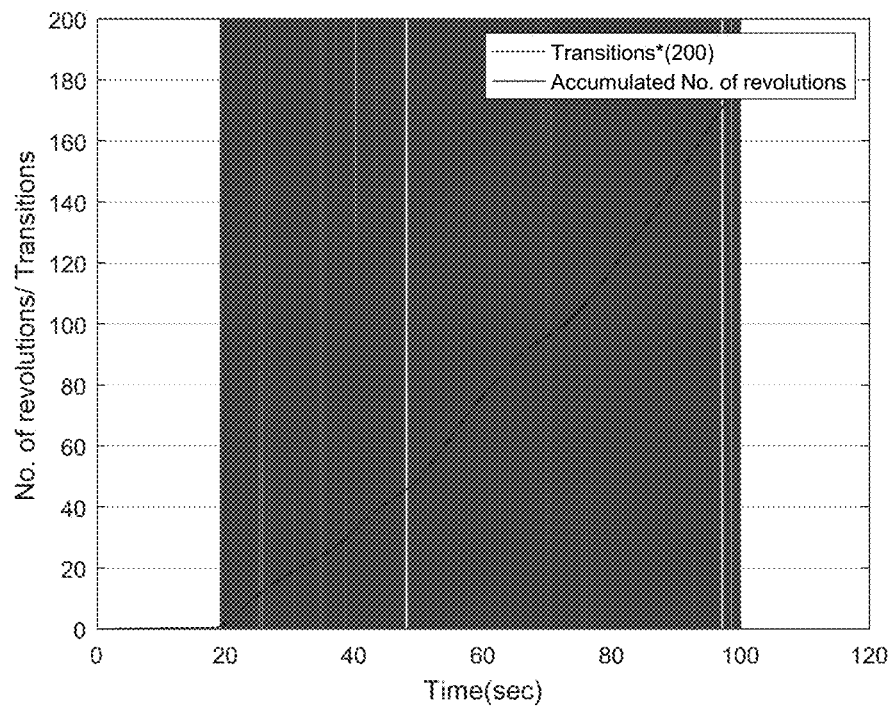
FIG. 32 show the data results for the dynamics-based estimation method using the symmetric rim data set.

Dynamics-Based Estimation Method for the Symmetric and Asymmetric Rim Datasets the GNSS signal is available for the first 100 seconds, where the traveled distance is estimated and then the number of wheel revolutions is computed. The ultrasonic sensor estimates the transitions between the solid and void parts and the transitions per revolution are computed. The transitions and the accumulated number of wheel revolutions for the first 100 seconds are exhibited in FIG. 32.

Figure 33A:
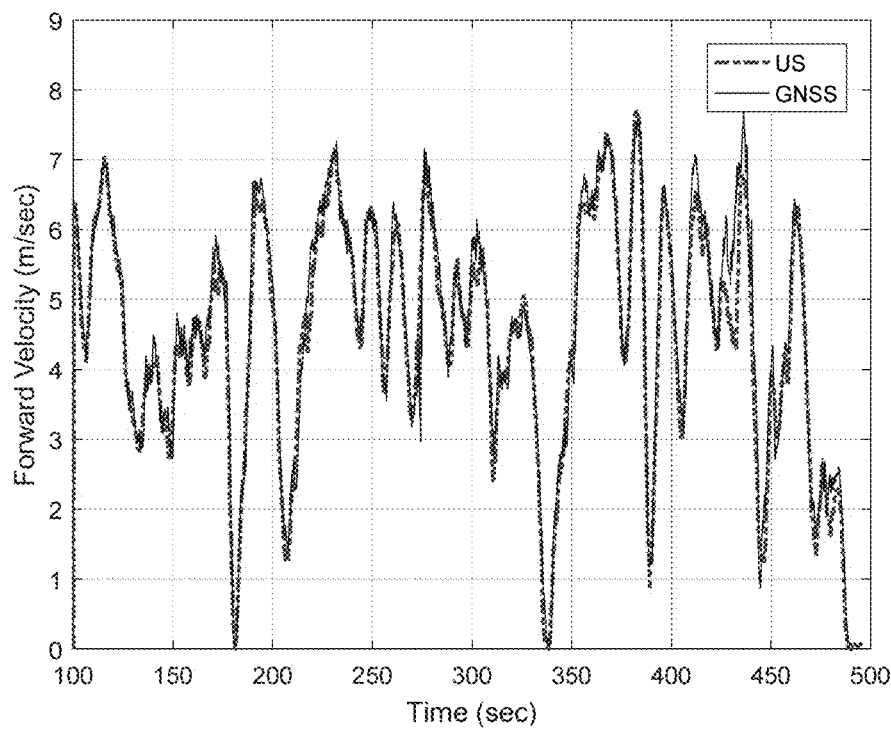
FIGS. 33A and 33B show the data sets for the symmetric and asymmetric data sets for the dynamics-based method during a GNSS signal outage.
Figure 33B:
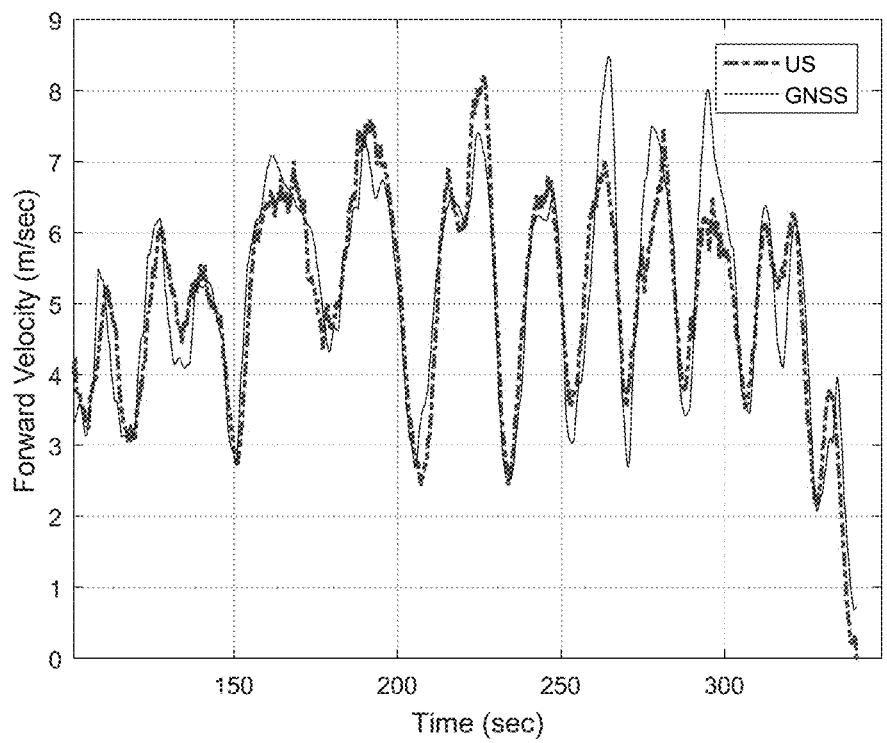

During GNSS signal outage which lasts for around 400 seconds, the ultrasonic transitions are estimated and, with the aid of the transition per revolution, the number of the wheel revolution is calculated. Finally, the traveled distance is computed and then the vehicle forward velocity is determined. FIGS. 33A and 33B show the dynamics-based ultrasonic velocity along with the GNSS velocity for both the symmetric and the asymmetric rim shape datasets.

The difference between the estimated forward velocity and the GNSS velocity is calculated to evaluate the dynamics-based computation method. The Root Mean Square Error (RMSE) of the ultrasonic forward velocity estimation is 0.34 m/sec and 0.60 m/sec for the symmetric and asymmetric datasets respectively.

Frequency-Based Estimation Method for the Symmetric and Asymmetric Rim Datasets

Figure 34A:
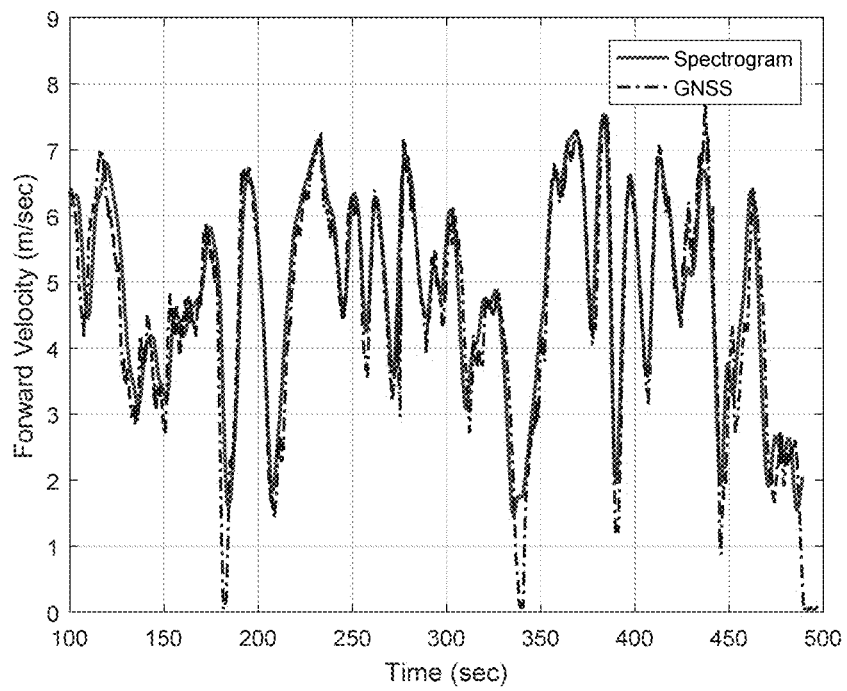
FIGS. 34A and 34B detail the frequency-based velocity and the GNSS velocity for the symmetric and the asymmetric rim datasets respectively.
Figure 34B:
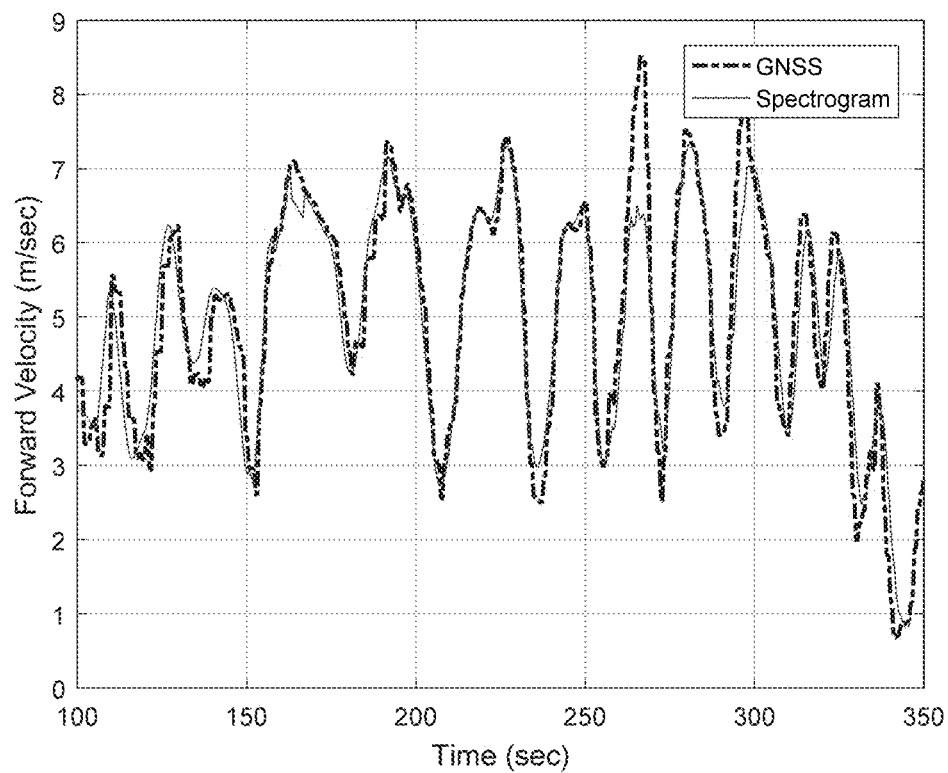
Figure 35A:
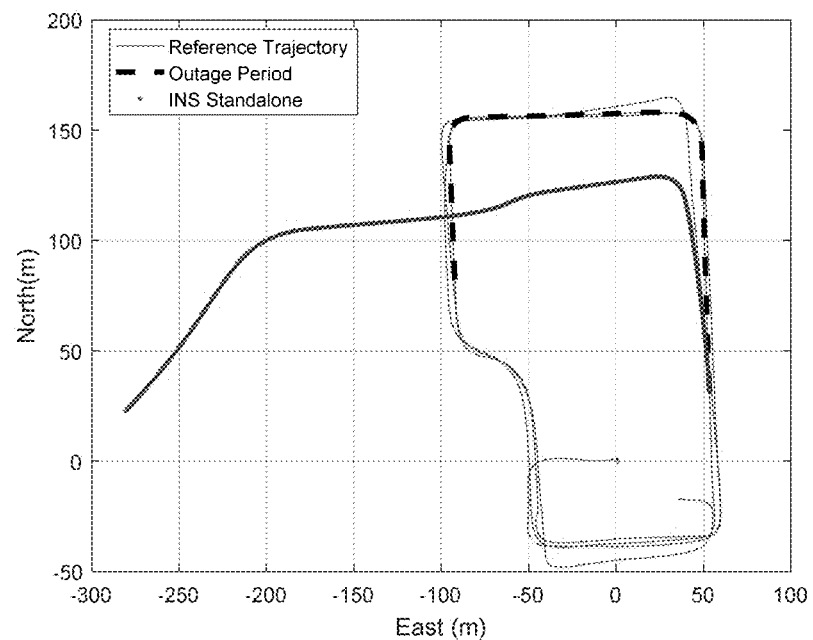
FIGS. 35A, 35B and FIGS. 36A and 36B show the trajectory for INS standalone solution as well as the INS/velocity updates using the rim geometric-based, dynamic-based and frequency-based velocity estimation for a 60 second GNSS signal outrage.
Figure 35B:
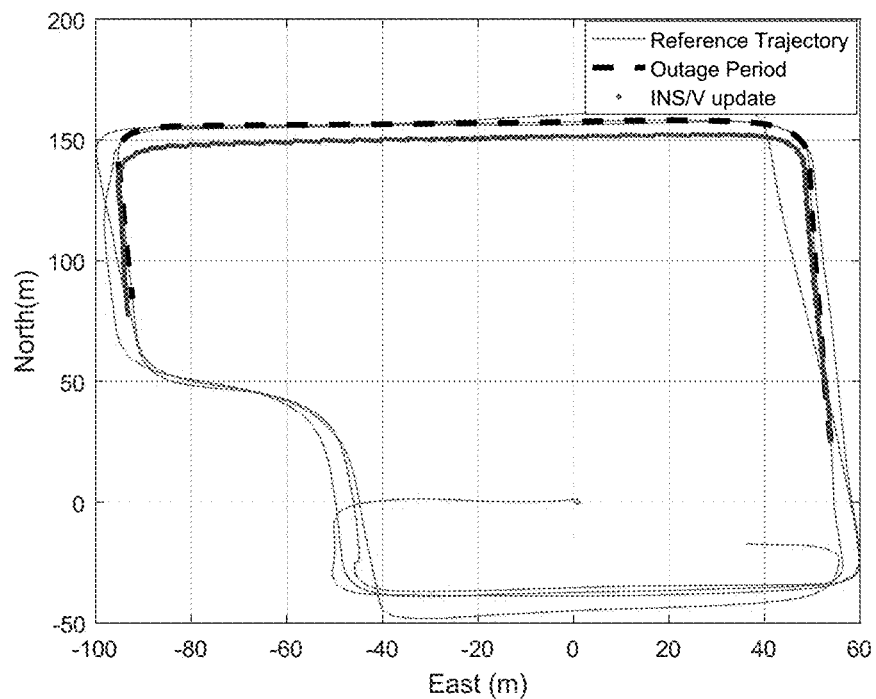
Figure 36A:
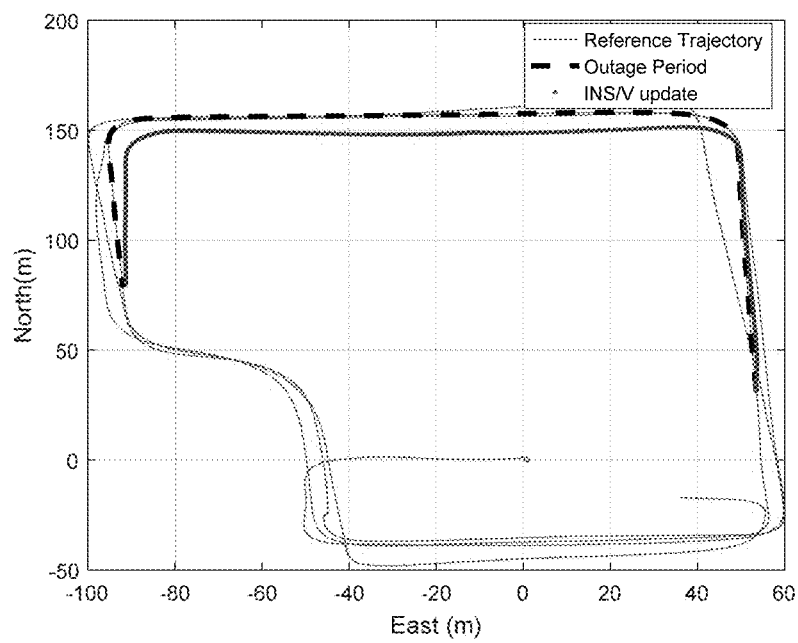
Figure 36B:
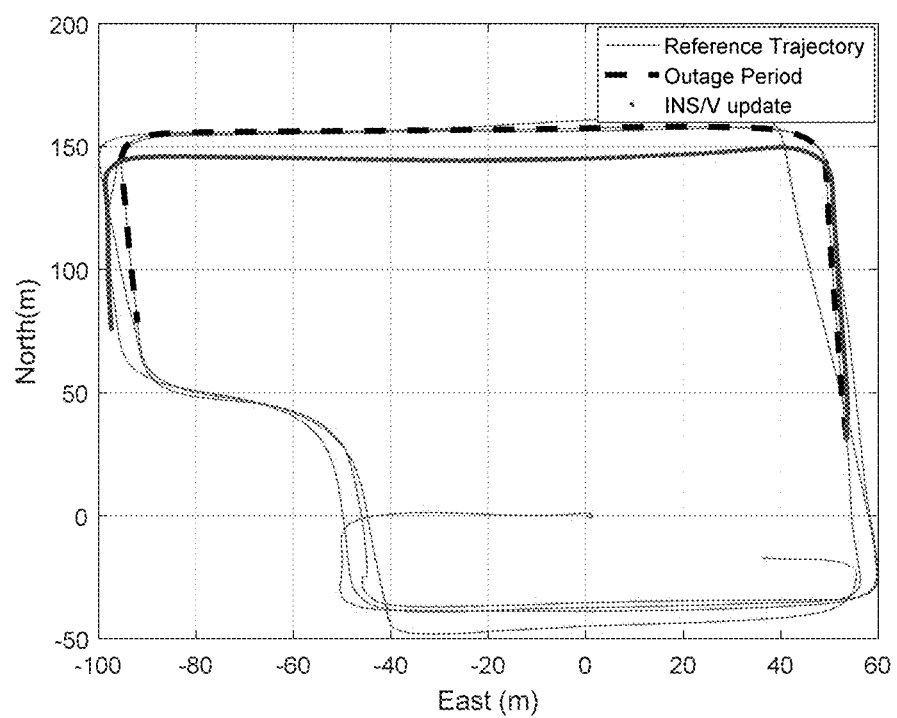

The GNSS provides the scale parameter of the spectrogram frequency to be used to estimate the forward velocity of the vehicle regardless of the wheel rim parameters. The frequency-based velocity and the GNSS velocity for the symmetric and the asymmetric rim datasets respectively are shown in FIGS. 34A and 34B.

The frequency-based estimation method cannot sense the forward velocity for less than 1 m/sec which is considered to be a limitation for using this method. The difference between the frequency-based velocity and the GNSS velocity is calculated to evaluate the proposed system. The RMSE of the estimated velocity is 0.54 m/sec and 0.60 m/sec for the symmetric and asymmetric datasets respectively.

Navigation State Estimation

The navigation states estimation is improved when the low-cost INS is aided using the proposed ultrasound-driven updates where the average position RMSE reaches to 5.50 meters (for the rim geometric-based estimation technique) while RMSE reaches to 5.59 meters and 7.44 meters (for the dynamics and frequency-based estimation methods respectively) rather than 80.85 meters for the INS standalone navigation solution (in the case of the symmetric rim shape) for different 60 seconds GNSS signal outages. Table 3 summarizes the average position RMSE for different forward velocity estimation methods. Table 3 shows the average position RMSE for different forward velocity updates estimation methods for a 60 second GNSS signal outage.

TABLE 3

| Navigation solution method | RMSE (m) |
| --- | --- |
| INS standalone solution | 80.85 |
| INS/V update (geometric based method) | 5.50 |
| INS/V update (Dynamics based method) | 5.59 |
| INS/V update (Frequency based method) | 7.44 |

FIGS. 35A and 35B and FIGS. 36A and 36B show the trajectory for INS standalone solution as well as the INS/ velocity updates using the rim geometric-based, dynamic-based and frequency-based velocity estimation for 60 seconds GNSS signal outage.

As can be seen, the different aspects of the present invention provide different techniques for estimating the vehicle forward velocity using ultrasonic sensors. These techniques may be used to aid the vehicle navigation system during a GNSS signal outage. The rim geometric-based method depends mainly on the rim shape parameters and the availability of the GNSS signal for certain time to estimate the vehicle forward velocity. The dynamics-based estimation method depends on calculating the transition numbers between the solid and void parts of the wheel rim per the wheel revolutions from the GNSS velocity during GNSS signal availability. During GNSS signal outage, the vehicle forward velocity is estimated using the ultrasonic number of the transitions and the predetermined transitions per wheel revolution. The frequency-based estimation method is based on spectrogram analysis of the ultrasonic signal where the GNSS provides the system with frequency scale factor during GNSS signal availability. The technique uses this factor to adjust the value of the frequency (the angular velocity) of the wheel to estimate the vehicle forward velocity. Table 4 shows a comparison of the three methods for estimating the forward vehicle velocity using ultrasonic sensor.

TABLE 4

| | Geometric-based | Dynamics-based | Frequency-based |
| --- | --- | --- | --- |
| A priori knowledge of rim parameters | Yes | No | No |
| Simplicity | Simple | Simple | Complex |
| Update latency | No latency | No latency | Latency |
| Processing time | Less | Moderate | Long |
| GNSS requirement | Yes | Yes | Yes |
| General method | No | Yes | Yes |
| Limitation | Symmetric rim only | No | Non-sensitive to small velocities |

These forward velocity estimation techniques enhance the position states estimation with a percentage around 92% as it provides the INS with a velocity updates for 60 seconds GNSS signal outage for land vehicle.

These techniques offer a new approach for estimating the forward velocity with a non-traditional low-cost sensor (costing about five dollars) to improve the land vehicle navigation. These techniques can be used with most of the wheel rim shapes as it is independent of the shape of the rim. The estimated forward velocity is provided with a high data rate (92 Hertz) to aid the INS during GNSS signal outage.

To better understand the various aspects of the present invention, the reader is directed to the listing of citations below. The contents of the citations below are hereby incorporated by reference herein in their entirety.

Abosekeen, A., Noueldin, A., Karamt, T., Korenberg, M. J., 2017. Comparative Analysis of Magnetic-Based RISS using Different MEMS-Based Sensors. Proc. 30th Int. Tech. Meet. Satell. Div. Inst. Navig. (ION GNSS+2017) 2944-2959.

Abosekeen, A., Noureldin, A., Korenberg, M. J., 2018. Utilizing the ACC-FMCW Radar for Land Vehicles Navigation. Proc. IEEE/ION Position, Locat. Navig. Symp. PLANS 2018 124-132. https://doi.org/10.1109/PLANS.2018.8373373

Borenstein, J. and L. F., 1996. Measurments and Correction of Systematic Odometry Errors in Mobile Robots. IEEE Trans. Robot. Autom. vol12, no6.

Borenstein, J., Koren, Y., 1988. Obstacle Avoidance With Ultrasonic Sensors. IEEE J. Robot. Autom. 4, 213-218. https://doi.org/10.1109/56.2085

Chirca, M., Chapuis, R., Lenain, R., 2015. Autonomous Valet Parking System Architecture. IEEE Conf. Intell. Transp. Syst. Proceedings, ITSC 2015—October, 2619-2624. https://doi.org/10.1109/ITSC.2015.421

D. C. Salmon, 2015. An Experimental Exploration of Low-Cost Solutions for Precision Ground Vehicle Navigation. Thesis. Auburn University, Alabama. https://doi.org/10.1109/PLANS.2014.6851404

Farooq, U., Hasan, K. M., Amar, M., Asad, M. U., 2013. Design and implementation of fuzzy logic based autonomous car for navigation in unknown environments. 2013 Int. Conf. Informatics, Electron. Vis. 1-7. https://doi.org/10.1109/ICIEV.2013.6572581

Gao, Y., Liu, S., Atia, M. M., Noureldin, A., 2015. INS/GPS/LiDAR integrated navigation system for urban and indoor environments using hybrid scan matching algorithm. Sensors (Switzerland) 15, 23286-23302. https://doi.org/10.3390/s150923286

Han, S., Park, S., Lee, K., 2009. Mobile Robot Navigation by Circular Path Planning Algorithm Using Camera and Ultrasonic Sensor. IEEE Int. Symp. Ind. Electron. (IS1E 2009) 1749-1754.

Jian, W., Xiumin, C., Yong, W., Rui, Z., 2008. The design of autonomous smart car used in simulation of vehicle platoon. Proc.—2008 Pacific-Asia Work. Comput. Intell. Ind. Appl. PACIIA 2008 1, 885-890. https://doi.org/10.1109/PACIIA.2008 0.344

Khan, M. O., Parker, G., 2017. Learning live autonomous navigation: A model car with hardware arduino neurons. 2016 IEEE Int. Conf. Syst. Man, Cybern. SMC 2016—Conf. Proc. 4118-4123. https://doi.org/10.1109/SMC.2016.7844877

Lee, B.-H., Song, J.-H., Im, J.-H., Im, S.-H., Heo, M.-B., Jee, G.-I., 2015. GPS/DR Error Estimation for Autonomous Vehicle Localization. Sensors 15, 20779-20798. https://doi.org/10.3390/s150820779

Lee, S., Yoon, D., Ghosh, A., 2008. Intelligent parking lot application using wireless sensor networks. 2008 Int. Symp. Collab. Technol. Syst. 48-57. https://doi.org/10.1109/CTS.2008.4543911

Lim, J., Lee, S. J., Tewolde, G., Kwon, J., 2014. Ultrasonic-sensor deployment strategies and use of smartphone sensors for mobile robot navigation in indoor environment. IEEE Int. Conf. Electro Inf. Technol. 593-598. https://doi.org/10.1109/EIT.2014.6871831

Moussa, M., Moussa, A., El-Sheimy, N., 2018. Multiple Ultrasonic Aiding System for Car Navigation in GNSS Denied Environment. Proc. IEEE/ION PLANS 2018, Monterey, Calif., April 2018, pp. 133-140.

Niu, X., Nassar, S., El-Sheimy, N., 2007. An Accurate Land-Vehicle MEMS IMU/GPS Navigation System Using 3D Auxiliary Velocity Updates. J. Inst. Navig. 54, 177-188.

Noureldin, Aboelmagd, Karamat, Tashfeen and Georgy, J., 2013. Fundamentals of Inertial Navigation Satellite-based Positioning and their integration. Springer-Verlag Berlin Heidelberg 2013.

Petovello, M. G., 2003. Real-Time Integration of a Tactical-Grade IMU and GPS for High-Accuracy Positioning and Navigation. Thesis. University of Calgary.

Shin, E.-H., 2001. Accuracy Improvement of Low Cost INS/GPS for Land Applications. Thesis 119.

Syed, Z., Aggarwal, P., Yang, Y., El-Sheimy, N., 2008. Improved vehicle navigation using aiding with tightly coupled integration. IEEE Veh. Technol. Conf. 3077-3081. https://doi.org/10.1109/VETECS.2008.335

Wang, Z., Tan, J., Sun, Z., 2015. Error Factor and Mathematical Model of Positioning with Odometer Wheel. Adv. Mech. Eng. 7, 305981. https://doi.org/10.1155/2014/305981

Wangping, Z., Dongcheng, B., Guodong, W., 2012. Design of the smart car for emergent disaster detection. World Autom. Congr. (WAC), 2012 1-3.

Won, D., Ahn, J., Sung, S., Heo, M., Im, S. H., Lee, Y. J., 2015. Performance Improvement of Inertial Navigation System by Using Magnetometer with Vehicle Dynamic Constraints. J. Sensors 2015. https://doi.org/10.1155/2015/435062

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for determining a direction of travel of a vehicle, the system comprising:
   a reflector for reflecting an ultrasonic signal, said reflector being mounted adjacent a wheel of said vehicle;
   an ultrasonic transceiver for producing said ultrasonic signal and for receiving a reflected version of said signal, said transceiver being mounted at a predetermined distance from said reflector;
   wherein
   a round trip time of travel as said signal is emitted from said transceiver and is received back at said transceiver is dependent upon whether said vehicle is travelling in a straight line, is turning left, or is turning right;
   when said vehicle is travelling in a straight line, said round trip time of travel is at a first value;
   when said vehicle is turning left, said round trip time of travel is at a second value range;
   when said vehicle is turning right, said round trip time of travel is at a third value range.

2. The system according to claim 1, wherein when said vehicle is turning, at least a portion of said wheel is placed in a path between said transceiver and said reflector.

3. The system according to claim 1, wherein said second value and said third value are both less than said first value.

4. The system according to claim 1, wherein said wheel is a front wheel of said vehicle.

5. The system according to claim 4, wherein said wheel is a left front wheel of said vehicle.

6. The system according to claim 4, wherein said wheel is a right front wheel of said vehicle.

7. The system according to claim 1, further comprising a processor for preprocessing raw data obtained using said system to filter out at least one of: outliers and noise.

8. The system according to claim 1, further comprising a processor for determining a change of heading of said vehicle using data obtained using said system.

9. The system according to claim 8, wherein said processor uses a linear regression model with said data obtained using said system to determine said change of heading of said vehicle.

10. The system according to claim 8, wherein said processor provides said change of heading as updates to an Inertial Navigation System.

* * * * *